(12) United States Patent
Minamikawa

(10) Patent No.: US 10,675,840 B2
(45) Date of Patent: Jun. 9, 2020

(54) TRANSFER FOIL, SECURITY LAMINATE, AND SECURITY LAMINATE PRODUCTION METHOD

(71) Applicant: TOPPAN PRINTING CO., LTD., Tokyo (JP)

(72) Inventor: Naoki Minamikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/379,383

(22) Filed: Apr. 9, 2019

(65) Prior Publication Data
US 2019/0232612 A1    Aug. 1, 2019

Related U.S. Application Data

(63) Continuation of application No. PCT/JP2017/037031, filed on Oct. 12, 2017.

(30) Foreign Application Priority Data

Oct. 12, 2016   (JP) .................................. 2016-201014

(51) Int. Cl.
*B32B 7/02*      (2019.01)
*B32B 7/027*     (2019.01)
(Continued)

(52) U.S. Cl.
CPC .............. *B32B 7/027* (2019.01); *B32B 7/12* (2013.01); *B32B 27/00* (2013.01); *B32B 27/08* (2013.01);
(Continued)

(58) Field of Classification Search
CPC .... C09J 201/00; C08L 2666/02; B32B 7/027; B32B 27/08
(Continued)

(56) References Cited

U.S. PATENT DOCUMENTS

2002/0058754 A1* 5/2002 Engel ................... A61K 8/0208
                                                        525/92 A
2005/0191560 A1    9/2005 Otaki et al.
(Continued)

FOREIGN PATENT DOCUMENTS

DE    10 2006 047 721 A    5/2007
EP          1 886 837 A1    3/2006
(Continued)

OTHER PUBLICATIONS

International Searching Authority, "International Search Report," issued in connection with International Patent Application No. PCT/JP2017/037031, dated Dec. 26, 2017.
International Searching Authority, "Written Opinion," issued in connection with International Patent Application No. PCT/JP2017/037031, dated Dec. 26, 2017.
(Continued)

*Primary Examiner* — Betelhem Shewareged
(74) *Attorney, Agent, or Firm* — Foley & Lardner LLP

(57) ABSTRACT

A transfer foil comprises a film-like substrate, and a layered transfer body having a pair of opposing surfaces and having an adhesion layer. A first surface of the pair of opposing surfaces is in contact with the substrate so as to be peelable from the substrate, and the adhesion layer is provided so as to include a second surface of the pair of opposing surfaces. The adhesion layer is a composite, and comprises a plurality of resin particles respectively comprising a first resin, and a layered base material comprising a second resin and filling gaps between the resin particles. The melting point of the second resin is lower than the melting point of the first resin. The transfer foil uses an adhesion layer of a composite of two incompatible resins that have different characteristics, such as melting point and crystallinity.

10 Claims, 9 Drawing Sheets

(51) Int. Cl.
| | |
|---|---|
| *B32B 27/08* | (2006.01) |
| *B32B 27/30* | (2006.01) |
| *B32B 7/12* | (2006.01) |
| *B44C 1/17* | (2006.01) |
| *B32B 27/00* | (2006.01) |
| *B42D 25/40* | (2014.01) |
| *B42D 25/45* | (2014.01) |
| *G02B 5/18* | (2006.01) |
| *C09J 201/00* | (2006.01) |

(52) U.S. Cl.
CPC .......... *B32B 27/306* (2013.01); *B32B 27/308* (2013.01); *B42D 25/40* (2014.10); *B42D 25/45* (2014.10); *B44C 1/1712* (2013.01); *G02B 5/18* (2013.01); *B32B 2307/30* (2013.01); *B32B 2307/416* (2013.01); *B32B 2307/704* (2013.01); *B32B 2425/00* (2013.01); *C08L 2666/02* (2013.01); *C09J 201/00* (2013.01)

(58) Field of Classification Search
USPC ...................................................... 428/195.1
See application file for complete search history.

(56) References Cited

U.S. PATENT DOCUMENTS

2006/0051686 A1\* 3/2006 Ide ..................... G03G 15/2064
430/18
2019/0232612 A1\* 8/2019 Minamikawa .......... B32B 27/08

FOREIGN PATENT DOCUMENTS

| | | |
|---|---|---|
| JP | S61-176969 A | 8/1986 |
| JP | 2000-234041 A | 8/2000 |
| JP | 2001-293982 A | 10/2001 |
| JP | 2004-098455 A | 4/2004 |
| JP | 2005-070064 A | 3/2005 |
| JP | 2005-104043 A | 4/2005 |
| JP | 2008-162260 A | 7/2008 |
| JP | 4925543 B2 | 4/2012 |
| WO | WO-2008/075533 A1 | 6/2008 |

OTHER PUBLICATIONS

Extended European Search Report dated Sep. 19, 2019 for corresponding App. No. 17860615.8 (8 pages).

\* cited by examiner

TRANSFER FOIL, SECURITY LAMINATE, AND SECURITY LAMINATE PRODUCTION METHOD

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/037031, filed on Oct. 12, 2017, which is based upon and claims the benefit of priority to Japanese Patent Application No. 2016-201014, filed on Oct. 12, 2016; the disclosures of which are all incorporated herein by reference in their entireties.

TECHNICAL FIELD

The present disclosure relates to a transfer foil, a security laminate comprising part of the transfer foil, and a method for producing the security laminate, and also relates to an authentication certificate comprising the security laminate.

BACKGROUND ART

Authentication certificates, such as cards and passports, are known to have a configuration in which a relief layer that exhibits optical effects, such as diffraction, is sandwiched between two laminate materials that form the outer shape of the authentication certificate.

When such an authentication certificate is produced, a transfer foil including a relief layer is first prepared, and the relief layer is bonded to a first laminate material. Subsequently, a second laminate material is stacked on the first laminate material, and the two laminate materials and the relief layer are then pressed while heating to thereby fuse the two laminate materials together. Thus, a security laminate obtained by integrating a laminate can be used as an authentication certificate (see, for example, PTL 1).

Compared with when a relief layer is transferred to a laminate material, when two laminate materials are fused together, it is necessary to maintain a state in which the laminate is heated to a higher temperature, or in which higher pressure is applied to the laminate, over a longer period of time. Therefore, compared with a relief layer positioned on the surface of the security laminate, a relief layer positioned in the inside of the security laminate is required to have a higher melting point and higher rigidity so that the relief layer is prevented from being damaged or deformed to the extent that the optical effects of the relief layer are affected.

CITATION LIST

[Patent Literature] PTL 1: JP 4925543 B2

SUMMARY OF THE INVENTION

Technical Problem

When the accuracy of the outline shape of a relief layer is during transfer of the relief layer is increased, it is preferable that the relief layer has a lower melting point and lower rigidity. Therefore, with the relief layer having a higher melting point and higher rigidity mentioned above, the accuracy of the outline shape of the relief layer may be reduced during transfer of the relief layer, because portions protruded from the outline of the transfer region or chipped portions are formed.

It is also required for the relief layer to have a higher melting point and high rigidity, as described above, in a configuration in which two laminate materials of a security laminate are bonded by an adhesive, and a configuration in which a relief layer is positioned on the surface of a security laminate. This is also required in a configuration in which a transfer foil includes only an adhesion layer and layers other than a relief layer.

An object of the present disclosure is to provide a transfer foil that can increase the accuracy of the outline shape of a layer formed by transfer on a transfer-receiving body, without reducing the resistance to heat and pressure, a security laminate, and a method for producing such a security laminate; and to also provide an authentication medium comprising the security laminate.

Improvement or Solution to Problem

A transfer foil for improving or solving the above problem comprises a film-like substrate, and a layered transfer body having a pair of opposing surfaces and having an adhesion layer. A first surface of the pair of opposing surfaces is in contact with the substrate so as to be peelable from the substrate, and the adhesion layer is provided so as to include a second surface of the pair of opposing surfaces. The adhesion layer is a composite, and comprises a plurality of resin particles respectively comprising a first resin, and a layered base material comprising a second resin and filling gaps between the resin particles. The melting point of the second resin is lower than the melting point of the first resin.

A security laminate for solving the above problem comprises a first laminate material, a second laminate material, and the above transfer body; wherein the transfer body is positioned between the first laminate material and the second laminate material.

A method for producing a security laminate for solving the above problem comprises forming a transfer foil comprising a film-like substrate and a transfer body, the substrate having a support surface, the transfer body including an adhesion layer, and the adhesion layer being formed on the support surface; transferring the transfer body to a first laminate material; and bonding the first laminate material and a second laminate material while the transfer body is sandwiched between the first laminate material and the second laminate material. The adhesion layer is a composite, and comprises a plurality of resin particles respectively comprising a first resin, and a layered base material comprising a second resin and filling gaps between the resin particles. The melting point of the second resin is lower than the melting point of the first resin.

With the above configuration, when a transfer region, which is part of the transfer body, is transferred to a transfer-receiving body, the layered base material is melted ahead of the resin particles by heating the adhesion layer, so that the viscosity of the layered base material is lower than the viscosity of the resin particles. Then, the adhesion layer is pressurized to thereby extrude the second resin, which constitutes the layered base material, from the inside of the transfer region to the outside. Thereby, a plural resin particles positioned in the inside of the transfer region are brought into contact with each other, whereby the plural resin particles are bonded together; whereas on the boundary of the transfer region, a plural resin particles are prevented from contacting with each other due to the second resin extruded from the transfer region, and the resin particles tend to be present as individual resin particles. Cohesive failure is more likely to occur in a portion of the adhesion layer containing a plurality of resin particles that are separately present than in a portion containing a plurality of resin particles that are bonded together.

As a result, due to the difference in the ease of occurrence of cohesive failure, the adhesion layer is easily broken from the boundary of the transfer region; eventually, the entire transfer body is easily broken, regardless of the melting point or rigidity of the layers contained in the transfer body, and the accuracy of the outline shape of the layer formed by transfer on the transfer-receiving body is increased.

In the above transfer foil, the first resin is preferably at least one of modified polyolefin, crystalline polyester, and an ethylene-vinyl acetate copolymer, and the second resin is preferably at least one of an acrylic resin, non-crystalline polyester, and a vinyl acetate-vinyl chloride copolymer.

With the above configuration, when the transfer-receiving body is a laminate material provided in a security laminate, an adhesion layer with adhesion to the laminate material can be formed.

In the above transfer foil, the first resin is preferably modified polyolefin or crystalline polyester, and the second resin is preferably an acrylic resin.

With the above configuration, modified polyolefin and crystalline polyester each have high solubility in solutions of specific solvents, while having low solubility in solutions of other solvents. Therefore, resin particles can be easily formed when modified polyolefin or crystalline polyester is used as the first resin. In addition, since modified polyolefin and crystalline polyester each have low compatibility with acrylic resins, an adhesion layer comprising a plurality of resin particles and a layered base material can be easily formed.

In the above transfer foil, the first resin is preferably crystalline polyester, and the second resin is preferably an acrylic resin.

The present inventor found that the accuracy of the outline shape of a transfer body transferred to a transfer-receiving body was significantly increased when the first resin was crystalline polyester and the second resin was an acrylic resin. In this respect, with the above configuration, the accuracy of the outline shape of a transfer body transferred to a transfer-receiving body can be significantly increased.

In the above transfer foil, the first resin is preferably a crystalline resin, and the second resin is preferably a non-crystalline resin.

In the above transfer foil, the transfer body may have a relief surface with unevenness, and may include a relief layer constituted from an ultraviolet-curing resin and an organosilicon compound.

With the above configuration, the organosilicon compound forms a siloxane bond in the relief layer; thus, thermal contraction of the relief layer can be prevented, and the formation of cracks in the relief layer can be prevented.

In the above transfer foil, the transfer body may comprise a reflective layer, the reflective layer may cover at least part of the relief surface, and may be constituted from aluminum or zinc sulfide, and the organosilicon compound may contain an amino group.

In the above transfer foil, the transfer body may comprise a reflective layer, the reflective layer may cover at least part of the relief surface, and may be constituted from aluminum or titanium dioxide, and the organosilicon compound may contain an acrylic group or a methacrylic group.

With the above respective configurations, the adhesion between the relief layer and the reflective layer is increased; thus, when the transfer body is transferred, the reflective layer can be prevented from being peeled from the relief layer.

In the above transfer foil, the relief layer preferably has a melting point of 180° C. or more.

With the above configuration, even when the relief layer included in the transfer body is heated and pressed in the production of a security authorization laminate, the relief layer can be prevented from being damaged or deformed.

Desired Advantageous Effects of the Invention

According to the present disclosure, the accuracy of the outline shape of a layer formed by transfer on a transfer-receiving body can be increased, without reducing the resistance to heat and pressure.

DESCRIPTION OF REPRESENTATIVE EMBODIMENTS

Figure 1:
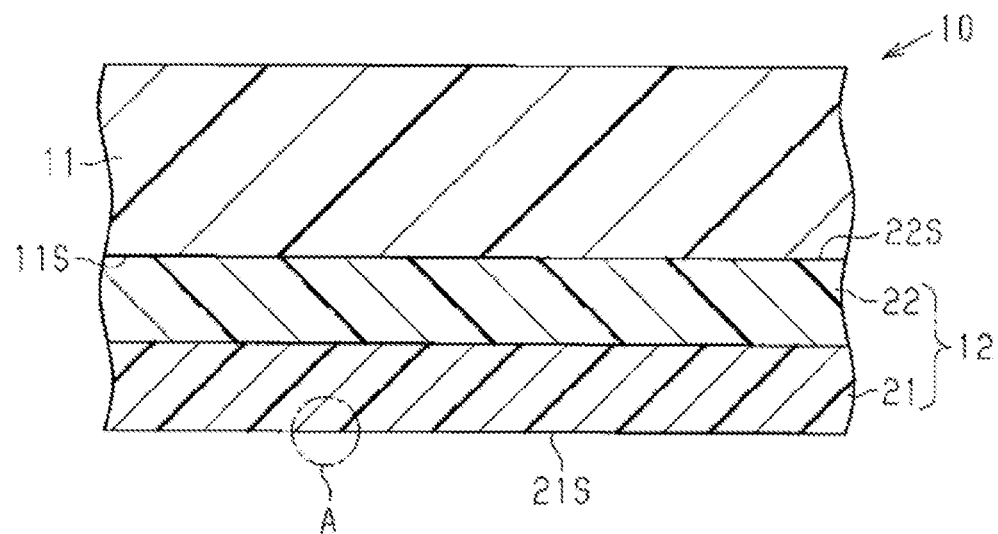
FIG. 1 is a cross-sectional view illustrating the configuration of a transfer foil in a first embodiment that embodies the transfer foil.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment

The first embodiment that embodies a transfer foil, a security laminate, and a method for producing a security laminate will be described with reference to FIGS. 1 to 11. The following will sequentially describe the configuration of the transfer foil, the material for forming each layer of the transfer foil, the method for producing a security laminate, and the effects of the transfer foil. In FIGS. 2, 3, and 9 to 11, resin particles are dotted for convenience to facilitate differentiation of the resin particles and a layered base material contained in the adhesion layer.

[Configuration of Transfer Foil]

The configuration of the transfer foil will be described with reference to FIGS. 1 to 3. FIG. 2 shows a cross-sectional structure enlarging the region A of FIG. 1.

Figure 2:
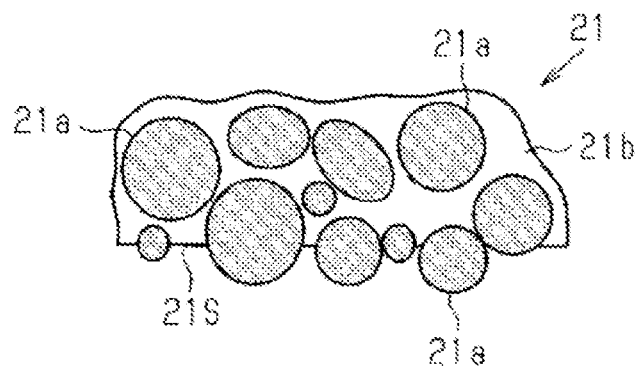
FIG. 2 is a partial enlarged cross-sectional view illustrating an enlarged region A of FIG. 1.

As shown in FIG. 1, the transfer foil 10 comprises a film-like substrate 11 and a layered transfer body 12. The substrate 11 has a support surface 11S. The transfer body 12 is positioned on the support surface 11S so as to be peelable from the support surface 11S, and includes an adhesion layer 21. The adhesion layer 21 contains an adhesion surface 21S on the opposite side of a surface of the transfer body 12 in contact with the support surface 11S.

The substrate 11 is constituted from a single support layer, and the transfer body 12 is constituted from an adhesion layer 21 and a release layer 22. In the transfer body 12, the release layer 22 contains a release surface 22S in contact with the support surface 11S, and the adhesion layer 21 contains an adhesion surface 21S to be bonded to a transfer-receiving body. In the transfer foil 10, the adhesion between the layers is configured so that interfacial breaking occurs between the substrate 11 and the release layer 22.

In other words, the transfer foil 10 comprises the film-like substrate 11, and the layered transfer body 12 having a pair of opposing surfaces and having the adhesion layer 21. A first surface of the pair of opposing surfaces is in contact with the substrate 11 so as to be peelable from the substrate 11. The adhesion layer 21 is provided so as to include a second surface of the pair of opposing surfaces. In the transfer foil 10, the release surface 22S is an example of the first surface, and the adhesion surface 21S is an example of the second surface.

The substrate 11 is not limited to a configuration containing only a support layer, and may have an intermediate layer positioned between the support layer and the release layer 22. The intermediate layer may be a layer that regulates the ease of peeling of the transfer body 12 from the substrate 11. The transfer body 12 may have an intermediate layer positioned between the release layer 22 and the adhesion layer 21. The intermediate layer may be a colored layer. In this case, when the transfer body 12 is transferred to a transfer-receiving body, the transfer body 12 indicating information by the color of the intermediate layer can be formed on the transfer-receiving body. The thickness of the intermediate layer can be set to 0.5 µm or more and 5 µm or less.

As shown in FIG. 2, the adhesion layer 21 comprises a plurality of resin particles 21a and a layered base material 21b that fills gaps between the resin particles 21a. The adhesion layer 21 is a composite. The resin particle 21a comprises a first resin, and the layered base material 21b comprises a second resin that has a melting point lower than that of the first resin. The first resin is preferably a crystalline resin. Examples of crystalline resins include resins having a crystallinity of 5% or more. The second resin is preferably a non-crystalline resin. Examples of non-crystalline resins include resins having a crystallinity of less than 5%.

In the adhesion surface 21S of the adhesion layer 21, some of the plural resin particles 21a are exposed from the layered base material 21b. In other words, the adhesion surface 21S of the adhesion layer 21 is a surface with unevenness, and the adhesion surface 21S is constituted from the outer surface of some of the resin particles 21a, and the outer surface of the layered base material 21b. All of the plural resin particles 21a may be positioned in the layered base material 21b; in other words, the whole adhesion surface 21S of the adhesion layer 21 may be constituted from the layered base material 21b.

In a configuration in which some of the resin particles 21a are exposed from the layered base material 21b, some of the resin particles 21a are brought into direct contact with a transfer-receiving body during transfer of the adhesion layer 21; thus, the adhesion of the portion of the adhesion layer 21 transferred to the transfer-receiving body is more likely to increase, compared with a configuration in which all the resin particles 21a are positioned in the inside of the layered base material 21b.

Figure 3:
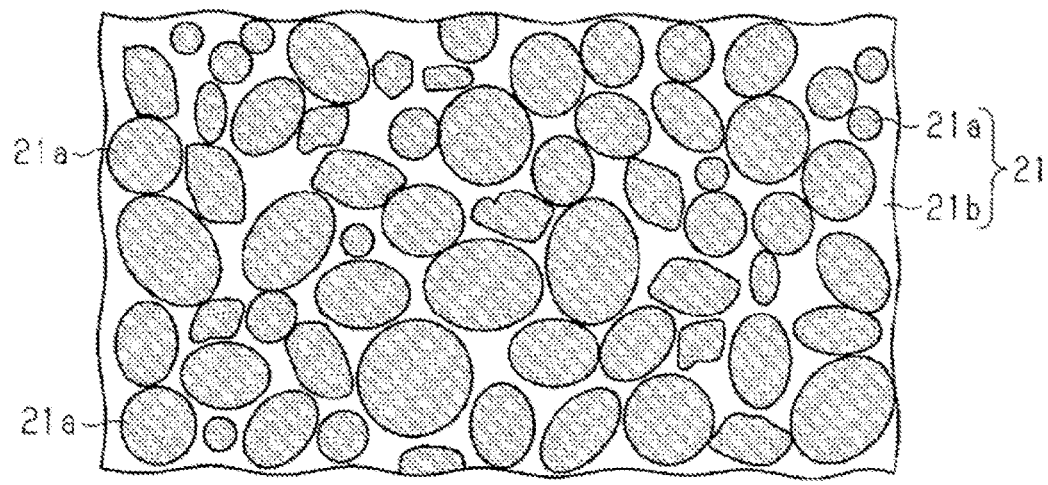
FIG. 3 is a partial enlarged plan view illustrating an enlarged partial configuration of an adhesion layer in the transfer foil.

As shown in FIG. 3, the plural resin particles 21a are randomly positioned in the adhesion layer 21. In other words, the plural resin particles 21a are irregularly positioned in the adhesion layer 21. The gaps formed between the plural resin particles 21a are filled with the layered base material 21b.

The plurality of resin particles 21a may include resin particles 21a having a circular cross-sectional shape in the thickness direction, i.e., a spherical shape. In addition, the plurality of resin particles 21a may include resin particles 21a having an elliptical cross-sectional shape in the thickness direction, i.e., an ellipsoidal shape; resin particles 21a having a rhomboid or partially elliptical cross-sectional shape in the thickness direction; and the like. That is, some or all of the resin particles 21a are granular, and the resin particles 21a may have several different shapes.

When the plural resin particles 21a have a spherical shape, the average diameter of the resin particles 21a is preferably 1 µm or more and 100 µm or less. When the plural resin particles 21a have a shape mentioned above, other than a spherical shape, the average maximum width of the resin particles 21a in the shape when the resin particles 21a are projected on the surface observed in plan view is preferably 1 µm or more and 100 µm or less.

[Material for Forming Each Layer]

The material for forming each layer present in the transfer foil 10 will be described with reference to FIG. 4.

[Adhesion Layer]

As described above, the adhesion layer 21 comprises a plurality of resin particles 21a respectively comprising a first resin, and a layered base material 21b comprising a second resin. The first resin is preferably at least one of modified polyolefin, crystalline polyester, and an ethylene-vinyl acetate copolymer. The second resin is preferably at least one of an acrylic resin, non-crystalline polyester, and a vinyl acetate-vinyl chloride copolymer.

It is preferable that the first resin is modified polyolefin or crystalline polyester, and that the second resin is an acrylic resin.

Modified polyolefin and crystalline polyester each have high solubility in solutions of specific solvents, while having low solubility in solutions of other solvents. Therefore, the resin particles 21a can be easily formed when modified polyolefin or crystalline polyester is used as the first resin. In addition, since modified polyolefin and crystalline polyester each have low compatibility with acrylic resins, an adhesion layer 21 comprising a plurality of resin particles 21a and a layered base material 21b can be easily formed.

When the first resin is crystalline polyester and the second resin is an acrylic resin, the ratio (M1:M2) of the mass of the first resin (M1) to the mass of the second resin (M2) in the adhesion layer 21 is preferably within the range of 3:7 to 7:3. That is, M1/M2 is preferably within the range of 3/7 to 7/3.

The adhesion layer 21 is a layer for attaching the transfer body 12, which is constituted from the adhesion layer 21 and the release layer 22, to a transfer-receiving body. The thickness of the adhesion layer 21 is preferably 0.5 µm or more and 20 µm or less.

When the transfer foil 10 is used for the production of authentication certificates of various cards and pages of booklets, such as passports and visas, preferably selected transfer-receiving bodies are transfer-receiving bodies formed from polyvinyl chloride (PVC), non-crystalline copolyester, and polycarbonate. These transfer-receiving bodies can be used as laminates. Moreover, the transfer foil 10 can also be used for the production of banknotes, tags, labels, seals, etc. In this case, paper and plastic films are used as transfer-receiving bodies. Thermoplastic resins can be used for plastic films. Usable examples of thermoplastic resins include polyethylene terephthalate (PET) and polyolefins. Instance of polyolefins include polypropylene and polyethylene. Further, films obtained by stretching these resins can also be used as transfer-receiving bodies.

In the step of transferring the transfer body 12 of the transfer foil 10 to a transfer-receiving body, it is preferable to transfer the transfer foil 10 at 120° C. or less, in order to prevent deformation of the transfer-receiving body by heat applied to the transfer-receiving body when the transfer body 12 is transferred. Moreover, it is preferable that the adhesion layer 21 exhibits adhesion at a transfer temperature of 80° C. or more, in order to prevent unintended sticking of the transfer foil 10 during storage of the transfer foil 10 at room temperature. Accordingly, the melting point of the first resin is preferably 80° C. or more and 120° C. or less.

As described above, when the materials for forming transfer-receiving bodies are PVC, non-crystalline copolyester, and polycarbonate, the first resin is preferably modified polyolefin, crystalline polyester, or an ethylene-vinyl acetate copolymer. These resins are preferable because they have higher adhesion to the above resins that are materials for forming transfer-receiving bodies, compared with other resins.

The second resin is preferably an acrylic resin, non-crystalline polyester, or a vinyl acetate-vinyl chloride copolymer. These second resins are preferable because they have adhesion lower than that of the first resin to the materials for forming transfer-receiving bodies mentioned above. Acrylic resins and vinyl acetate-vinyl chloride copolymers are generally non-crystalline. Instance of acrylic resins include polymethyl methacrylate resin, urethane-modified acrylic resin, and epoxy-modified acrylic resin. Examples of non-crystalline polyester include resins that are adjusted to have low crystallinity by copolymerizing aromatic dicarboxylic acids, such as terephthalic acid and isophthalic acid, with diol components, such as ethylene glycol and diethylene glycol. Examples of vinyl acetate-vinyl chloride copolymers include those using rigid polyvinyl chloride or flexible vinyl chloride. The melting point of the second resin is 40° C. or more and 70° C. or less, for example.

It is preferable that the adhesion to transfer-receiving bodies differs between the first resin and the second resin. The adhesion of the first resin to the transfer-receiving body is preferably 1.5 times to 2 times the adhesion of the second resin to the transfer-receiving body.

As described above, the average diameter of the resin particles 21a, or the average maximum width of the resin particles 21a is preferably 1 µm or more and 100 µm or less, and more preferably 5 µm or more and 20 µm or less. When the average diameter of the resin particles 21a or the average maximum width of the resin particles 21a is 1 µm or more, the accuracy of the outline shape of the layer formed by transfer can be easily increased. Moreover, when the average diameter of the resin particles 21a or the average maximum width of the resin particles 21a is 100 µm or less, it is possible to prevent decrease in the adhesion of the resin particles 21a to the transfer-receiving body due to the large size of the resin particles 21a, and to prevent decrease in the accuracy of the outline shape of the layer formed by transfer.

As described above, the ratio (M1:M2) of the mass of the first resin (M1) to the mass of the second resin (M2) in the adhesion layer 21 is preferably within the range of 3:7 to 7:3, and more preferably within the range of 5:5 to 7:3. That is, M1/M2 is more preferably within the range of 5/5 to 7/3. When the ratio of the mass of the first resin to the mass of the second resin is within the range of 5:5 to 7:3, the ratio of the particle-like first resin in the adhesion layer 21 increases, compared with a configuration in which the mass of the first resin is much smaller than the mass of the second resin; thus, cohesive failure easily occurs inside the adhesion layer 21. As a result, the accuracy of the outline shape of the layer formed by transfer is easily increased.

The difference Δ between the melting point of the first resin and the melting point of the second resin is preferably 50° C. or more and 100° C. or less. With a difference of Δ between the melting point of the first resin and the melting point of the second resin is 50° C. or more, the effects due to the particle-like first resin and the layered second resin filling gaps between the particles can be easily obtained. Moreover, with a difference of Δ between the melting point of the first resin and the melting point of the second resin is 100° C. or less, the first resin is easily melted; thus, reduction in adhesion to the transfer-receiving body can be prevented.

It is preferable that the first resin is crystalline polyester, and that the second resin is an acrylic resin. More specifically, VYLON GM-920 (VYLON is a registered trademark) produced by Toyobo Co., Ltd. can be used as the first resin. The melting point of VYLON GM-920 is 107° C. Dianal BR-102 (Dianal is a registered trademark) produced by Mitsubishi Rayon Co., Ltd. can be used as the second resin. The glass transition temperature of Dianal BR-102 is 20° C. The ratio of the mass of the first resin to the mass of the second resin is preferably 6:4, for example.

Polyester having a crystalline state at a constant ratio in which molecular chains are regularly arranged is called crystalline polyester. The ratio of the crystalline state of crystalline polyester is at most 30% to 45%, and preferably 5% or more. Examples of polyester resins that are easily transformed into a crystalline state include those having structures such as nylon (PA), polyphenylene sulfide (PPS), polyacetal (POM), polyethylene (PE), polybutylene terephthalate (PBT), and polypropylene (PP). In crystalline polyester, not all portions have a crystal structure, but amorphous parts are also present at a constant ratio; thus, the appearance tends to be slightly cloudy, depending on the difference in optical refractive index. Examples of crystalline polyester include VYLON GM-920 produced by Toyobo Co., Ltd., as mentioned above.

For accurate measurement of crystallinity, an X-ray diffraction measurement method can be used. Practically, the presence of a crystalline state and the degree of crystallinity can be determined by measurement using a differential scanning calorimeter (DSC). The differential scanning calorimeter (DSC) is a device whereby the temperature of a reference substance and the temperature of a sample are measured and compared, while applying constant heat to the reference substance and the sample, the thermal physical properties of the sample are recognized as a temperature difference, and endothermic reactions and exothermic reactions due to changes in the state of the sample are measured. The endothermic peak accompanying melting of crystals is measured using a differential scanning calorimeter (DSC), so that the presence of a crystalline state in the sample can be confirmed. Moreover, the heat of fusion can be determined from the endothermic peak area, and further the degree of crystallinity can be derived from the heat of fusion. The melting points of the first and second resins, and the resins and materials used for the layers and laminate materials of the first embodiment and a second embodiment, described later, can be measured by a differential scanning calorimeter (DSC).

Figure 4:
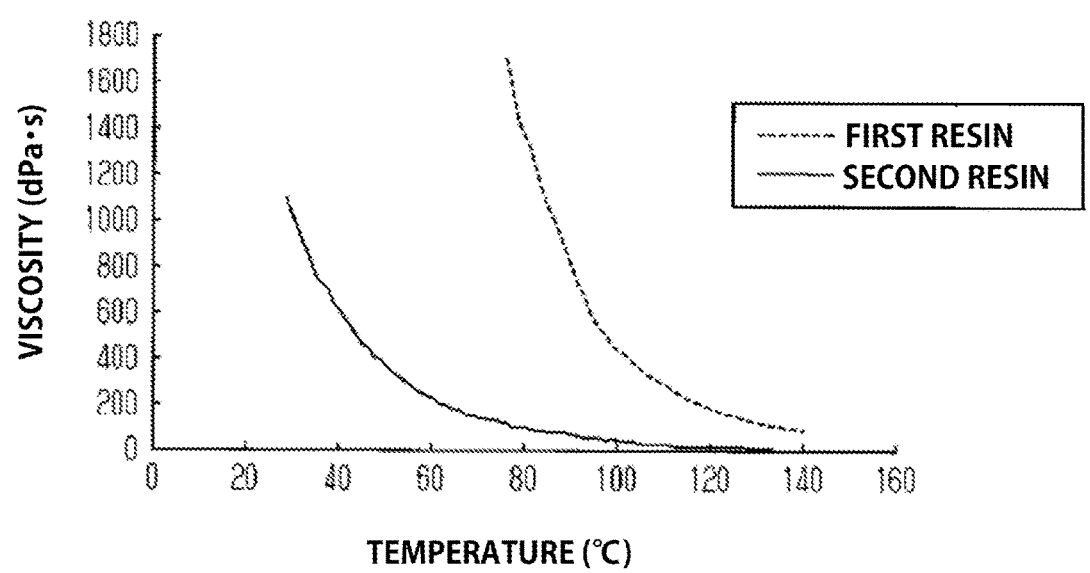
FIG. 4 is a graph illustrating the relationship between temperature and viscosity in an example of a first resin and an example of a second resin.

FIG. 4 shows the relationship between temperature and viscosity in the first resin and the second resin. The first resin is an example of modified polyolefin, and the second resin is an example of an acrylic resin.

Because the melting point of the first resin is higher than the melting point of the second resin, the second resin is melted at a temperature lower than the melting point of the first resin, so that it changes from solid to liquid. The viscosity of the second resin is thereby rapidly reduced from the viscosity as a solid to the viscosity as a liquid at a lower temperature, compared with the viscosity of the first resin.

As shown in FIG. 4, between the example of the first resin and the example of the second resin, the viscosity of the second resin is lower than the viscosity of the first resin at 30° C. to 130° C. In particular, the difference between the viscosity of the second resin and the viscosity of the first resin is significant in the range of 40° C. or more and 80° C. or less. For example, at 80° C., the viscosity of the second resin is 100 dPa·s, whereas the viscosity of the first resin is 1400 dPa·s. The viscosity of the first resin is 14 times higher than the viscosity of the second resin.

The adhesion layer 21, which is constituted from the resin particles 21a and the layered base material 21b, can be formed using the compatibility of the first resin and the second resin. That is, the adhesion layer 21, which is constituted from the resin particles 21a and the layered base material 21b, can be formed by mixing the first resin and the second resin, both of which are incompatible with each other.

The term that the first resin and the second resin are compatible with each other means that in a solution obtained by mixing a solution in which the first resin is dissolved, and a solution in which the second resin is dissolved, the transparency of the solution mixture is the same as the transparency of the solution of each resin. Moreover, the term that they are compatible with each other means that in a dispersion obtained by mixing a dispersion in which the first resin is dispersed, and a dispersion in which the second resin is dispersed, the transparency of the dispersion mixture is the same as the transparency of the dispersion of each resin.

Alternatively, the term that they are compatible with each other means that in the solution mixture of two solutions mentioned above, the transparency of a solid obtained by drying the solvent is the same as the transparency of each solution. Furthermore, the term that they are compatible with each other means that in the dispersion mixture of two dispersions mentioned above, the transparency of a solid obtained by drying the dispersion medium is the same as the transparency of each dispersion.

In order to determine whether the solution mixture of two solutions, and the dispersion mixture of two dispersions, are each compatible or incompatible, a turbidity method by visual observation is preferably used, in terms of simplicity and high reliability. After it is visually determined that each solution or each dispersion before mixing is transparent, it is determined by visual observation whether the transparency of the solution mixture or dispersion mixture is the same as that before mixing, whereby whether the two resins are compatible can be determined. Moreover, as evaluation by measurement, the transmissivity of resins before and after mixing can be measured and compared. A microscope can be used to observe the compatibility state.

Alternatively, whether two resins are compatible can be determined in such a manner that the solution mixture or dispersion mixture is dried to form a resin layer, and whether the transparency of the resin layer is the same as that of each solution or each dispersion before mixing is determined by visual observation. In any case, when the transparency of the solution mixture or dispersion mixture, or the resin layer, is the same as that of each solution or each dispersion before mixing, it can be determined that the two resins are compatible.

In visual observation, the wavelength of visible light, (i.e., about 500 nm) is regarded as the minimum unit. Therefore, when the solution mixture or dispersion mixture, or solids thereof, are transparent, this indicates that at a scale larger than the wavelength of visible light, the concentration and composition of the solution mixture or dispersion mixture, or solids thereof, are uniform; in other words, they are compatible. On the other hand, when the solution mixture or dispersion mixture, or solids thereof, are opaque, this indicates that the concentration and composition of the solution mixture or dispersion mixture, or solids thereof are not uniform; in other words, they are incompatible.

The compatibility of the two resins can be adjusted with reference to the average molecular weight, crystallinity, polarity, and solubility parameter of each resin.

In general, resins with a higher average molecular weight have a lower dissolution rate, and resins with a lower average molecular weight have a higher dissolution rate. For example, in a chain polymer resin, the forces of attraction between polymer molecules are stronger, as the molecular chain is longer, that is, the average molecular weight is higher. Accordingly, as the average molecular weight of the polymer molecules is higher, it is more difficult to disperse the polymer molecules in a solvent by undoing entanglement of the molecular chains using the solvent molecules.

Moreover, the forces of attraction between polymer molecules are stronger as the contact surfaces of two polymer molecules are larger. That is, the forces of attraction between polymer molecules are stronger as the orientation of the polymer molecules is higher, that is, the crystallinity of the polymer molecules is higher. Therefore, in a chain polymer resin, the polymer resin is less likely to be dissolved in a solvent, as the average molecular weight (i.e., the degree of polymerization) is higher, and the area of a portion having crystallinity contained in the chain polymer resin is larger. When the first resin is a crystalline resin, it is less likely to be dissolved in a solvent; whereas when the second resin is a non-crystalline resin, it is likely to be dissolved in a solvent. As a result, the crystalline first resin tends to become granular, while the non-crystalline second resin tends to become a layered base material.

Another factor for determining the compatibility of two resins is the affinity between solvent molecules and the resins. For example, polar polymer resins are likely to be dissolved in polar solvents, and are less likely to be dissolved in non-polar solvents; whereas non-polar polymer resins are likely to be dissolved in non-polar solvents, and are less likely to be dissolved in polar solvents. As a factor for determining the degree of affinity, the solubility parameter (SP value) δ is known. The solubility parameter δ is represented by the following formula (1). In principle, the solubility of a polymer resin in a solvent is higher, as the difference between the solubility parameter δ of the polymer resin and the solubility parameter δ of the solvent molecules is smaller. In the formula (1), ΔE is evaporation energy, and V is molar volume.

[Math. 1]

$$\delta^2 = \frac{\Delta E}{V} \quad (1)$$

Solubility parameter δ values of resins and solubility parameter δ values of solvents are listed below. The values shown in parentheses following the resin or solvent names are the solubility parameter δ values of the resins or solvents.

Regarding resins, for example, the following solubility parameters δ are known: polyvinyl acetate (9.1), acrylic resin (9.2), polyvinyl chloride (9.3), nitrocellulose (10.1), cellulose acetate (11), cellulose diacetate (11.4), and polystyrene (8.6 to 9.7).

Regarding solvents, for example, the following solubility parameters δ are known: cyclohexane (8.2), butyl acetate (8.5), toluene (8.9), ethyl acetate (9.1), methyl ethyl ketone (9.3), tetrahydrofuran (9.5), acetone (10), ethyl alcohol (12.7), and water (23.4).

For example, to increase the dissolution rate of a resin in a solvent, a resin having a solubility parameter δ that is less different from the solubility parameter δ of the solvent may be selected. In contrast, to reduce the dissolution rate of a resin in a solvent, a resin having a solubility parameter δ that is much different from the solubility parameter δ of the solvent may be selected.

Thus, the use of resins that are incompatible with each other as the first resin and the second resin makes it possible to form an adhesion layer 21 comprising a plurality of resin particles 21a respectively formed from the first resin, and a layered base material 21b formed from the second resin and filling gaps between the plural resin particles 21a. Other methods that is able to form an adhesion layer 21 having a plurality of resin particles 21a and a layered base material 21b can be applied for forming an adhesion layer 21.

The first resin and the second resin may each have fluorescence. Fluorescence can be realized by adding a fluorescent material or having a fluorescent molecular structure in the molecule. Fluorescent materials include fluorescent pigments or fluorescent dyes. The transfer state can be thereby easily examined by irradiating the adhesion layer 21 with excitation light.

[Substrate]

The substrate 11 supports the transfer body 12 before transfer to a transfer-receiving body. A plastic film can be used as the substrate 11. i.e., support layer. Usable examples of materials for forming plastic films include polyethylene terephthalate (PET), polyethylene naphthalate (PEN), polypropylene (PP), and the like. The substrate 11, i.e., support layer, is typically a monolithic layer. The material for forming the film is preferably a material that is less likely to be deformed or deteriorated by heat, pressure, etc., applied to the substrate 11 during formation of the transfer body 12. As the substrate 11, paper, synthetic paper, plastic multilayered paper, resin impregnated paper, etc., can be used, in addition to plastic films.

The thickness of the substrate 11 is preferably 4 μm or more, and more preferably 12 μm or more and 50 μm or less. When the thickness of the substrate 11 is 4 μm or more, the substrate 11 has sufficient physical strength; thus, difficulty in handling the substrate 11 can be reduced.

[Release Layer]

The release layer 22 is a layer for positioning the transfer body 12 on the support surface 11S of the substrate 11 so that it can be peeled from the substrate 11. The release layer 22 is peeled from the substrate 11, and prevents the adhesion layer 21 from being damaged by external factors after the transfer body 12 is transferred to a transfer-receiving body.

Resins and lubricants can be applied as the materials for forming the release layer 22. Among these, usable examples of resins include thermoplastic resins, thermosetting resins, ultraviolet-curing resins, electron beam-curing resins, and the like. Specifically, an acrylic resin, a polyester resin, a polyamide resin, or the like can be used as the resin for forming the release layer 22. Usable examples of lubricants include polyethylene powder, paraffin wax, silicone, and waxes such as carnauba wax. The thickness of the release layer 22 is preferably 0.5 μm or more and 5 μm or less. The melting point of the release layer is typically 120° C. or more and 150° C. or less.

The material for forming the release layer 22 may contain a coloring material. The coloring material is a pigment, a dye, or the like. The pigment may be a pigment emitting fluorescence or phosphorescence. Moreover, an inorganic pigment or an organic pigment is used as the pigment. Because the release layer 22 contains such a coloring material, the release layer 22 has a color, so that a transfer body 12 indicating information by color can be formed on a transfer-receiving body. The release layer 22 may entirely contain a coloring material, or may partially have a color area containing a coloring material. The number of color areas may be one or two or more. The color area can also indicate information by its outline shape. Moreover, the release layer 22 may be provided with two or more color areas having different colors.

[Transfer-Receiving Body]

Paper and plastic films can be used as transfer-receiving bodies to which the transfer body of the transfer foil 10 is transferred. Usable examples of materials for forming plastic films include polyethylene terephthalate (PET), polyethylene naphthalate (PEN), polypropylene (PP), polyvinyl chloride (PVC), non-crystalline copolyester (PET-G), polycarbonate (PC), and the like. The thickness of the transfer-receiving body is preferably 50 µm or more and 500 µm or less, and more preferably 75 µm or more and 400 µm or less.

[Method for Producing Security Laminate]

The method for producing a security laminate will be described with reference to FIGS. 5 to 8.

The method for producing a security laminate comprises forming a transfer body 12 containing an adhesion layer 21 on a support surface 11S of a film-like substrate 11 to thereby form a transfer foil 10, and transferring the transfer body 12 of the transfer foil 10 to a first laminate material.

Formation of the transfer foil 10 includes forming the adhesion layer 21 so that the adhesion layer 21 contains an adhesion surface 21S on the opposite side of a surface in contact with the support surface 11S, and so that the adhesion layer 21 contains a plurality of resin particles 21 respectively comprising a first resin, and a layered base material 21b comprising a second resin that has a melting point lower than that of the first resin, and filling gaps between the resin particles 21a.

In other words, the method for producing a security laminate comprises forming a transfer foil 10 comprising a layered substrate 11 and a transfer body 12, wherein the substrate 11 has a support surface 11S, the transfer body 12 contains an adhesion layer 21, and the adhesion layer 21 is formed on the support surface 11S. The method for producing a security laminate may further comprise transferring the transfer body 12 to a first laminate material, and bonding the first laminate material and a second laminate material while the transfer body 12 is sandwiched between the first laminate material and the second laminate material. The adhesion layer 21 comprises a plurality of resin particles respectively comprising a first resin, and a layered base material 21b comprising a second resin and filling gaps between the resin particles 21a. The melting point of the second resin is lower than the melting point of the first resin. The adhesion layer 21 is a composite.

Figure 5:
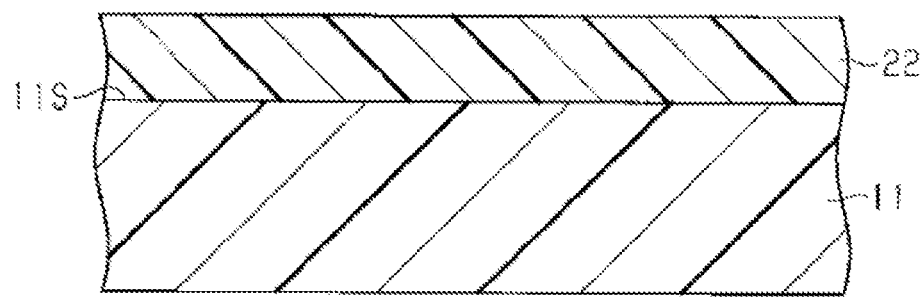
FIG. 5 is a process diagram illustrating a process of forming a release layer on a substrate in a method for producing a transfer foil.

More specifically, as shown in FIG. 5, in the method for producing a security laminate, a substrate 11 is first prepared, and a release layer 22 is formed on a support surface 11S of the substrate 11. Printing and coating are used to form the release layer 22. Gravure printing can be used for printing, and gravure coating, micro-gravure coating, die coating, or the like can be used for coating. Further, an intermediate layer can also be formed in the same manner.

Figure 6:
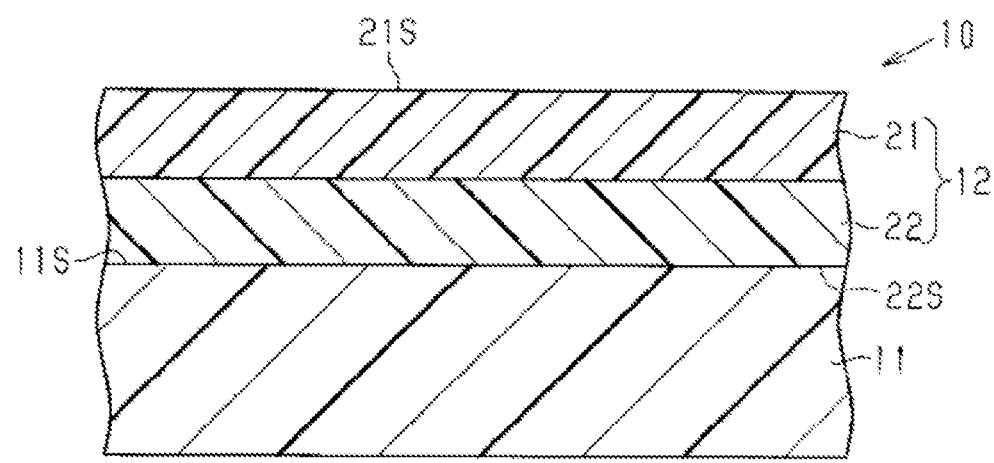
FIG. 6 is a process diagram illustrating a process of forming an adhesion layer on the release layer in the method for producing a transfer foil.

As shown in FIG. 6, an adhesion layer 21 having an adhesion surface 21S is formed on a surface of the release layer 22 on the opposite side of the release surface 22S in contact with the support surface 11S of the substrate 11. Printing and coating are used to form the adhesion layer 21. Usable examples of printing include gravure printing, flexographic printing, screen printing, offset printing, and the like. Usable examples of coating include gravure coating, micro-gravure coating, lip coating, and the like. Thus, the transfer foil 10 having the substrate 11 and the transfer body 12 can be obtained.

Figure 7:
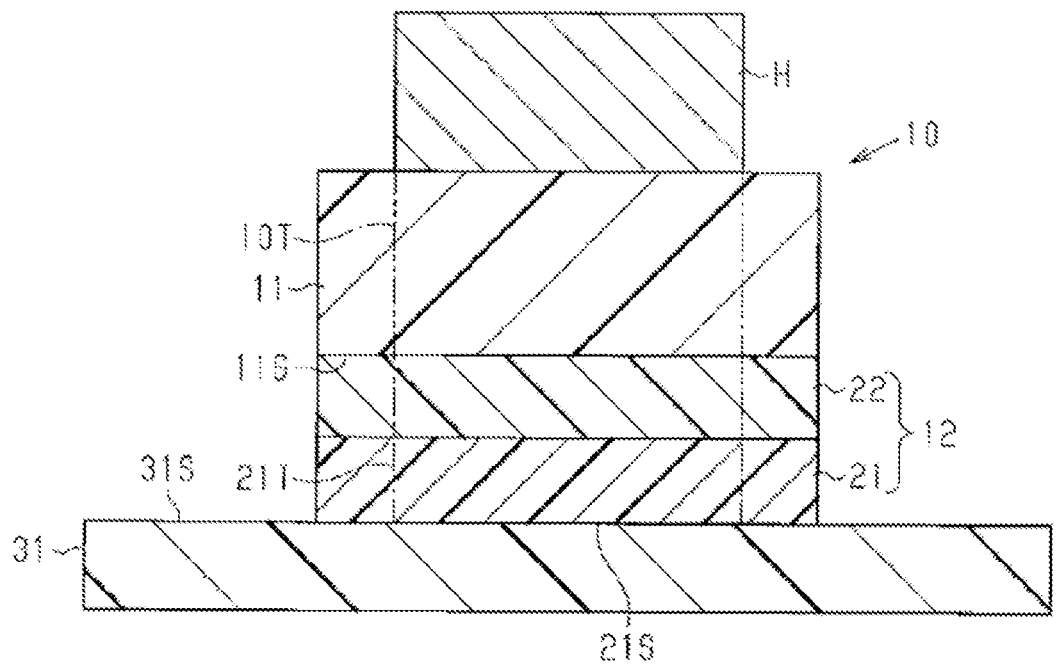
FIG. 7 is a process diagram illustrating a process of applying heat and pressure to a transfer foil while the transfer foil is brought into contact with a transfer-receiving body.

As shown in FIG. 7, a transfer-receiving body 31, which is an example of the first laminate material, is prepared. The transfer-receiving body 31 has a transfer-receiving surface 31S to which the transfer body 12 of the transfer foil 10 is transferred. While the adhesion surface 21S of the adhesion layer 21 is brought into contact with the transfer-receiving surface 31S of the transfer-receiving body 31, heat and pressure are applied to the transfer body 12 from the substrate 11 of the transfer foil 10. A hot stamp H is brought into contact with a surface of the substrate 11 on the opposite side of the support surface 11S, and the hot stamp H applies, to the transfer foil 10, heat and force in the direction from the substrate 11 toward the transfer body 12.

In this case, in plan view facing the transfer-receiving surface 31S of the transfer-receiving body 31, heat and pressure are applied to a portion of the transfer foil 10 overlapping with the hot stamp H. The portion of the transfer foil 10 to which heat and pressure are applied is a transfer target 10T, and the portion of the adhesion layer 21 contained in the transfer target 10T is a transfer region 21T.

Figure 8:
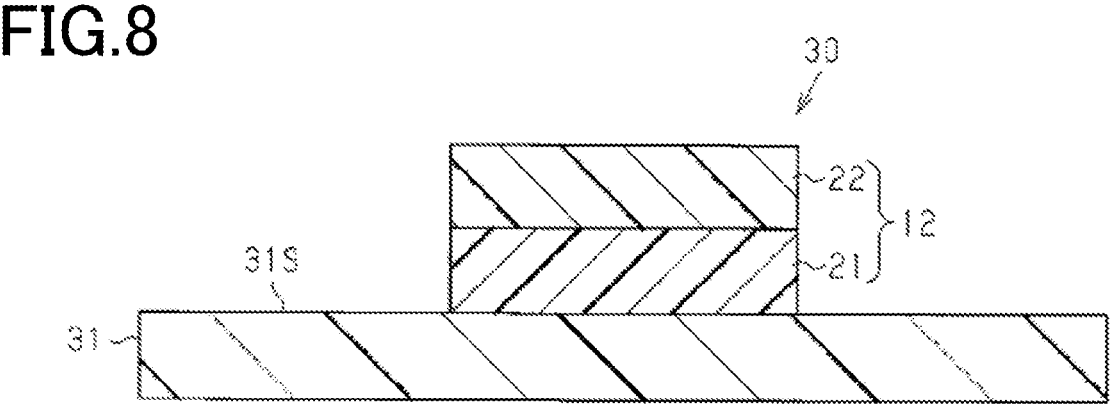
FIG. 8 is a process diagram illustrating a process of transferring a transfer body to a transfer-receiving body.

As shown in FIG. 8, when the position of the transfer foil 10 relative to the transfer-receiving body 31 is changed, interfacial breaking occurs between a portion of the substrate 11 contained in the transfer target 10T, and a portion of the release layer 22 contained in the transfer target 10T. The portion of the transfer body 12 contained in the transfer target 10T is thereby transferred to the transfer-receiving body 31. Thus, a security laminate 30 can be obtained.

The security laminate 30 may contain information for authenticating the owner of the security laminate 30 in which that the transfer body 12 has a shape showing images or characters. Alternatively, in the security laminate 30, the transfer-receiving body 31 may contain information for authenticating the owner of the security laminate 30.

[Action of Transfer Foil]

Figure 9:
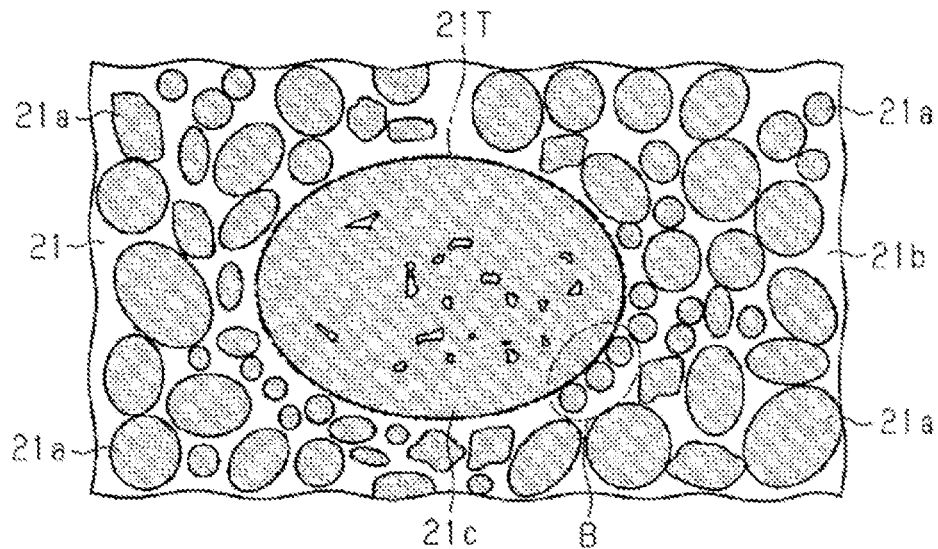
FIG. 9 is a plan view illustrating the configuration of an adhesion layer when heat and pressure are applied to a transfer foil.
Figure 10:
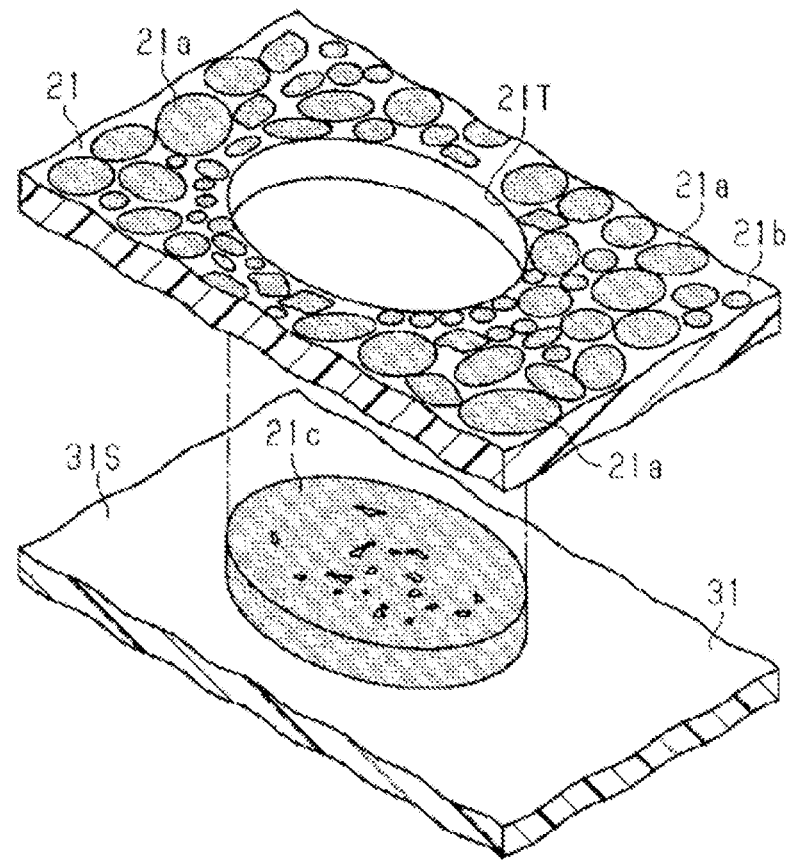
FIG. 10 is a perspective view illustrating the configuration of an adhesion layer when a transfer body is transferred to a transfer-receiving body.
Figure 11:
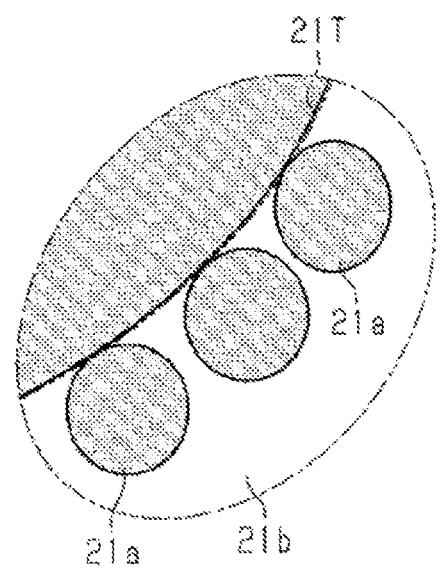
FIG. 11 is a partial enlarged plan view illustrating an enlarged partial configuration of an adhesion layer.

The action of the transfer foil 10 will be described with reference to FIGS. 9 to 11. As the action of the transfer foil 10, the action of the adhesion layer 21 when the transfer target 10T in the transfer foil 10 is transferred to the transfer-receiving body 31 will be described below. FIGS. 9 and 10 show only the adhesion layer 21 for convenience of explanation. FIG. 11 shows a planar structure enlarging the region B of FIG. 9.

As shown in FIG. 9, when heat and pressure are applied to the transfer target 10T of the transfer foil 10, heat and pressure are applied to the transfer region 21T of the adhesion layer 21. In this case, for example, the adhesion layer 21 is heated to about 80° C. Because the melting point of the second resin is lower than the melting point of the first resin, as described above, the viscosity of the second resin significantly decreases from the viscosity before heating, ahead of the viscosity of the first resin. Moreover, because the first resin is crystalline, and the second resin is non-crystalline, melting of the first resin requires more heat than that for melting of the second resin. This difference in crystallinity has the action of supplementarily reducing the viscosity of the second resin ahead of the viscosity of the first resin.

Moreover, because pressure is applied to the transfer region 21T simultaneously with heat, the second resin with reduced viscosity is extruded from the inside of the transfer region 21T to the outside, whereas the resin particles 21a formed from the first resin remain in the inside of the transfer region 21T. In this manner, the ratio of the second resin on the outer side of the edge of the transfer region 21T is higher than the ratio of the second resin in the inside of the transfer region 21T.

In the inside of the transfer region 21T, each of the plural resin particles 21a is brought into contact each other because the second resin is extruded to the outside of the transfer region 21T, and the plural resin particles 21a are bonded together because heat and pressure are applied to the plural resin particles 21a. Thereby, the plural resin particles 21a positioned in the inside of the transfer region 21T form a film-like mass 21c, and the filmy mass 21c exhibits adhesion to the transfer-receiving body 31 in the transfer region 21T.

In contrast, the second resin with low viscosity extruded from the transfer region 21T is positioned on the outer side of the edge of the transfer region 21T. Accordingly, the plural resin particles 21a are less likely to be in contact with each other on the outer side of the edge of the transfer region 21T. Therefore, the plural resin particles 21a positioned in the vicinity of the transfer region 21T are prevented from being bonded to each other due to heat and pressure applied to the transfer region 21T. That is, the resin particles 21a are each apart from other resin particles 21a and maintained in a particle shape.

Because of this, in the adhesion layer 21, breaking strength in the inside of the transfer region 21T significantly differs from the breaking strength on the outer side of the edge of the transfer region 21T. In other words, cohesive failure is less likely to occur in the inside of the transfer region 21T, while cohesive failure is more likely to occur in the outside of the transfer region 21T.

As shown in FIG. 10, when the position of the adhesion layer 21 relative to the transfer-receiving body 31 changes, due to the difference in the ease of occurrence of cohesive failure between the transfer region 21T and the outside thereof, the adhesion layer 21 is easily broken from the boundary of the transfer region 21T; eventually, the entire transfer body 12 is easily broken.

Therefore, as shown in FIG. 11, cohesive failure occurs between the transfer region 21T and the outside thereof, not in the inside of the resin particles 21a, but at the edge of the resin particles 21a, or in a portion apart from the resin particles 21a, i.e., a portion filled with the second resin. The portion apart from the resin particles 21a is a portion that is not in contact with the resin particles 21a. The film-like mass 21c of the adhesion layer 21 is thereby transferred to the transfer-receiving body 31. As a result, the accuracy of the outline shape of the layer formed by transfer on the transfer-receiving body 31 is increased, regardless of the melting point or rigidity of the layers contained in the transfer body 12.

In a configuration in which the adhesion layer has a layered shape formed from the first resin or the second resin, a difference is less likely to occur in breaking strength between the transfer region in the adhesion layer, and the portion other than the transfer region. Accordingly, burrs and cracks are formed in the layer transferred to the transfer-receiving body. "Burrs" are excessive portions protruded from the outline of the transfer region to the outside, and "cracks" are portions depressed inside from the outline of the transfer region. In other words, the accuracy of the outline shape of the layer transferred to the transfer-receiving body is reduced.

In contrast, in the adhesion layer 21 constituted from a plurality of resin particles 21a and a layered base material 21b, the frequency of formation of burrs and cracks can be reduced, for the reason described above; even if burrs and cracks are formed, their size can be made smaller. In other words, the accuracy of the outline shape of the layer transferred to the transfer-receiving body can be increased.

EXAMPLES

Example 1

A PET film having a thickness of 25 μm (Lumirror 25T60, produced by Toray Industries, Inc.) (Lumirror is a registered trademark) was prepared as a substrate, and release layer ink having the following composition was applied to a thickness of 1 μm by gravure coating to the support surface of the substrate.

After the solvent contained in the release layer ink was removed by volatilization, adhesion layer ink having the following composition was applied to a thickness of 4 μm by gravure coating to the release layer. In the adhesion layer ink, crystalline polyester was used as a first resin for forming resin particles, and an acrylic resin was used as a second resin for forming a layered base material. In the adhesion layer ink, i.e., in the adhesion layer, the ratio of the mass of the first resin to the mass of the second resin was set to 1:9. The average maximum width of the resin particles was 10 μm.

The adhesion layer ink was obtained by mixing a dispersion in which a plurality of resin particles respectively constituted from the first resin were dispersed, and a solution in which the second resin was dissolved.

The solvent contained in the adhesion layer ink was removed by volatilization. In this manner, a transfer foil of Example 1 was obtained.

[Release Layer Ink]

Polymer methacrylate (PMMA) resin (Dianal BR100, produced by Mitsubishi Rayon Co., Ltd.): 10 parts Methyl ethyl ketone (VC102, produced by Toyo Ink Co., Ltd.): 90 parts

[Adhesion Layer Ink]

[Resin Particles]

Crystalline polyester (VYLON GM-920, produced by Toyobo Co., Ltd.)

Methyl ethyl ketone (VC102, produced by Toyo Ink Co., Ltd.)

[Layered Base Material]

Acrylic resin (Dianal BR-102, produced by Mitsubishi Rayon Co., Ltd.)

Toluene (PD102, produced by Toyo Ink Co., Ltd.)

Example 2

A transfer foil of Example 2 was obtained by the same method as Example 1, except that the ratio of the mass of the first resin to the mass of the second resin in the adhesion layer was changed to 3:7.

Example 3

A transfer foil of Example 3 was obtained by the same method as Example 1, except that the ratio of the mass of the first resin to the mass of the second resin in the adhesion layer was changed to 5:5.

Example 4

A transfer foil of Example 4 was obtained by the same method as Example 1, except that the ratio of the mass of the first resin to the mass of the second resin in the adhesion layer was changed to 7:3.

Example 5

A transfer foil of Example 5 was obtained by the same method as Example 1, except that the ratio of the mass of the first resin to the mass of the second resin in the adhesion layer was changed to 9:1.

Comparative Example 1

A transfer foil of Comparative Example 1 was obtained by the same method as Example 1, except that a layered adhesion layer was formed using only crystalline polyester (same as Example 1) as a resin.

Comparative Example 2

A transfer foil of Comparative Example 2 was obtained by the same method as Example 1, except that a layered adhesion layer was formed using only an acrylic resin (same as Example 1) as a resin.

Comparative Example 3

A transfer foil of Comparative Example 3 was obtained by the same method as Example 1, except that a layered adhesion layer was formed using only a urethane resin (Nippollan 5196, produced by Tosoh Corporation) (Nippollan is a registered trademark) as a resin. The adhesion layer ink used herein was adhesion layer ink having the following composition.

[Adhesion Layer Ink]
Urethane resin (Nippollan 5196, produced by Tosoh Corporation): 20 parts
Methyl ethyl ketone (VC102, produced by Toyo Ink Co., Ltd.): 50 parts
Toluene (PD102, produced by Toyo Ink Co., Ltd.): 50 parts

TABLE 1

|  | Resin particles | Layered base material | First resin:second resin | Transfer accuracy |
|---|---|---|---|---|
| Example 1 | Crystalline polyester | Acrylic resin | 1:9 | High |
| Example 2 | Crystalline polyester | Acrylic resin | 3:7 | Higher |
| Example 3 | Crystalline polyester | Acrylic resin | 5:5 | Higher |
| Example 4 | Crystalline polyester | Acrylic resin | 7:3 | Higher |
| Example 5 | Crystalline polyester | Acrylic resin | 9:1 | High |
| Comparative Example 1 | — | Crystalline polyester | — | Low |
| Comparative Example 2 | — | Acrylic resin | — | Low |
| Comparative Example 3 | — | Urethane resin | — | Low |

[Evaluation]

A transfer-receiving body having a thickness of 100 μm (LEXAN SD8B94, produced by SABIC) (LEXAN is a registered trademark) was prepared, and the transfer body of each transfer foil was transferred using a hot-stamp transfer machine. In this case, the transfer temperature was set to 120° C., the pressure was set to 200 kg/cm$^2$, and the transfer time was set to 1 second.

As shown in Table 1, when the outline shape of the layer formed on the transfer-receiving body using each transfer foil was visually observed, a plurality of burrs and a plurality of cracks were observed when the transfer foils of Comparative Examples 1 to 3 were used. That is, it was recognized that the accuracy of the outline shape of the layer formed by transfer was low ("Low").

In contrast, when the outline shape of the layer formed using each of the transfer foils of Examples 1 and 5 was visually observed, a plurality of burrs and a plurality of cracks were observed; however, it was recognized that they were smaller than the burrs and cracks observed in Comparative Examples 1 to 3, and that the number of burrs and cracks were less than those of Comparative Examples 1 to 3. That is, it was recognized that according to the transfer foils of Examples 1 and 5, the accuracy of the outline shape of the layer formed by transfer was high ("High").

Further, when the outline shape of the layer formed using each of the transfer foils of Examples 2 to 4 was visually observed, it was recognized that almost no burrs and cracks were formed. That is, it was recognized that according to the transfer foils of Examples 2 to 4, the accuracy of the outline shape of the layer formed by transfer was higher ("Higher").

As explained above, according to the first embodiment of the transfer foil, the security laminate, and the method for producing a security laminate, the effects listed below can be obtained.

(1) Due to the difference in the ease of occurrence of cohesive failure, the adhesion layer 21 is easily broken from the boundary of the transfer region 21T; eventually, the entire transfer body 12 is easily broken, regardless of the melting point or rigidity of the layers contained in the transfer body 12. Accordingly, the accuracy of the outline shape of the layer formed by transfer on the transfer-receiving body 31 can be increased.

(2) When the transfer-receiving body 31 is a laminate material provided in a security laminate, an adhesion layer 21 having adhesion to the laminate material can be formed.

(3) When the first resin is crystalline polyester and the second resin is an acrylic resin, the accuracy of the outline shape of the transfer body 12 transferred to the transfer-receiving body 31 can be significantly increased by adjusting the ratio of the mass of the first resin to the mass of the second resin in the adhesion layer 21 within the range of 3:7 to 7:3.

Second Embodiment

The second embodiment of the transfer foil, the security laminate, and the method for producing a security laminate will be described with reference to FIGS. 12 to 19. The second embodiment is different from the first embodiment in that the transfer foil of the second embodiment has a relief layer and a reflective layer. Accordingly, this difference is described in detail below. Further, the same reference signs are assigned to the structures of the second embodiment same as those of the first embodiment, and the detailed description thereof is omitted. The following will sequentially describe the configuration of the transfer foil, the configuration of the security laminate, the material for forming each layer constituting the security laminate, a method for producing an authentication certificate comprising the security laminate, and Test Examples.

[Configuration of Transfer Foil]

Figure 12:
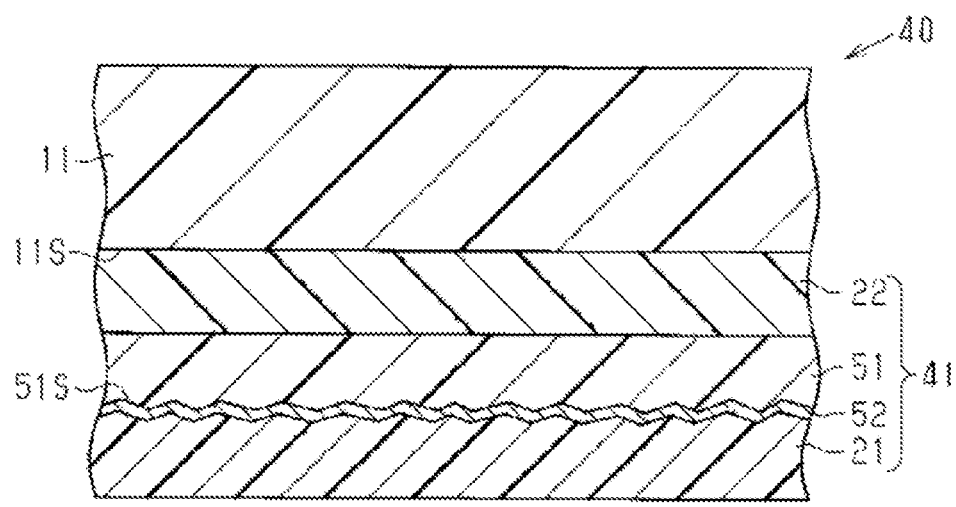
FIG. 12 is a cross-sectional view illustrating the configuration of a transfer foil in a second embodiment that embodies the transfer foil.

The configuration of the transfer foil will be described with reference to FIG. 12.

The transfer foil 40 comprises a substrate 11 and a transfer body 41. The transfer body 41 comprises an adhesion layer 21 and a release layer 22, as with the transfer foil 10 of the first embodiment, and further comprises a relief layer 51 and a reflective layer 52. In the transfer body 41, the release layer 22, the relief layer 51, the reflective layer 52, and the adhesion layer 21 are stacked in this order.

The relief layer 51 contains a relief surface 51S with unevenness, and is constituted from an ultraviolet-curing resin and an organosilicon compound. In the relief layer 51, the ratio (M3:M4) of the mass of the ultraviolet-curing resin (M3) to the mass of the organosilicon compound (M4) is preferably within the range of 3:7 to 9:1. That is, M3/M4 is preferably within the range of 3/7 to 9/1.

The reflective layer 52 covers the entire relief surface 51S, but may cover at least part of the relief surface 51S. The material for forming the reflective layer 52 is preferably aluminum, zinc sulfide, or titanium dioxide. When the material for forming the reflective layer 52 is aluminum or zinc sulfide, the organosilicon compound preferably contains an amino group. When the material for forming the reflective layer 52 is aluminum or titanium dioxide, the organosilicon compound preferably contains an acrylic group or a methacrylic group. In this case, the ratio (M3:M4) of the mass of the ultraviolet-curing resin (M3) to the mass of the organosilicon compound (M4) in the relief layer 51 is preferably within the range of 3:7 to 7:3. That is, M3/M4 is preferably within the range of 3/7 to 7/3. The melting point of the relief layer 51 is preferably 180° C. or more.

The reflective layer 52 may be omitted from the transfer foil 40. With such a configuration, the relief layer 51 and the adhesion layer 21 may have different refractive indices. Due to the difference in refractive index between the two layers, light can be reflected on the relief surface 51S of the relief layer 51.

[Configuration of Authentication Certificate]

Figure 13:
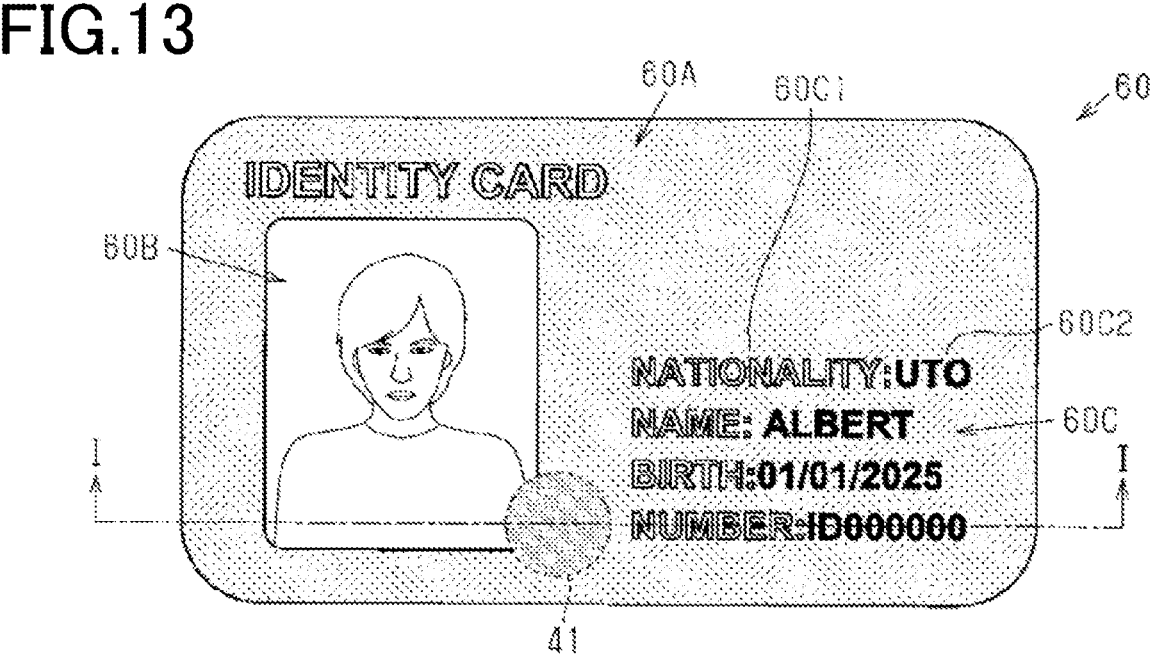
FIG. 13 is a plan view illustrating the configuration of an authentication certificate.
Figure 14:
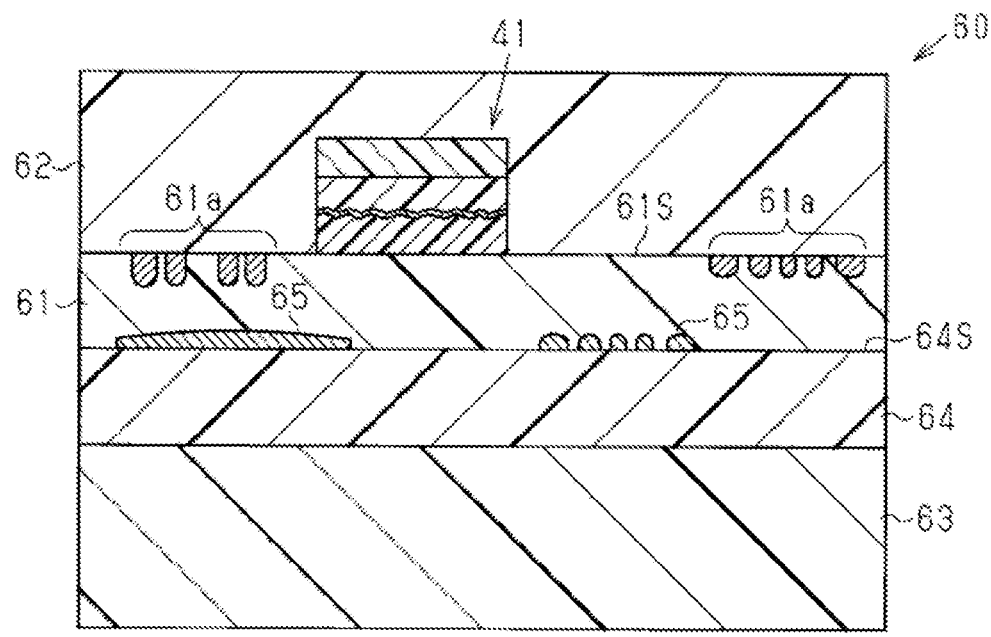
FIG. 14 is a cross-sectional view illustrating a configuration taken along I-I line of FIG. 13.

The configuration of the authentication certificate will be described with reference to FIGS. 13 and 14. In FIG. 14, the thickness of each layer with respect to the width thereof is exaggerated, for convenience to illustrate each layer constituting the authentication certificate.

The authentication certificate 60 comprises a security laminate. The authentication certificate 60 is typically a card, as shown in FIG. 13. Other forms are pages of a booklet comprising a security laminate. Examples of the authentication certificate 60 in the form a card include ID cards, credit cards, license cards, point cards, and the like. Examples of booklets include passports, visas, and the like. The authentication certificate 60 can be used as a page of a booklet in which authentication information is recorded. The authentication certificate 60 contains a plurality of pieces of information. The information contained in the authentication certificate 60 includes the name 60A of the authentication certificate 60, an image 60B, and a character string 60C. Moreover, the authentication certificate 60 contains the transfer body 41 of the transfer foil 40 mentioned above.

The image 60B is a facial image of the owner of the authentication certificate 60. The character string 60C is the personal information of the owner of the authentication certificate 60, including, for example, nationality, name, birth date, and individual number. The character string 60C contains the type 60C1 of personal information, and unique information 60C2 unique to the owner of the authentication certificate 60. The image 60B contained in the authentication certificate 60 may be an image other than the owner's facial image, and the character string 60C may be information different from the personal information mentioned above.

As shown in FIG. 14, the authentication certificate 60 comprises a transfer-receiving body 61, which is an example of the first laminate material, and an upper laminate material 62, which is an example of the second laminate material. Further, the authentication certificate 60 comprises a transfer body 41 positioned between the transfer-receiving body 61 and the upper laminate material 62.

The authentication certificate 60 comprises a first lower laminate material 63 and a second lower laminate material 64. In the authentication certificate 60, the first lower laminate material 63, the second lower laminate material 64, the transfer-receiving body 61, and the upper laminate material 62 are stacked in this order. The first lower laminate material 63, the transfer-receiving body 61, and the upper laminate material 62 are transparent, for example; and the second lower laminate material 64 is white, for example.

The transfer body 41 is positioned on a transfer-receiving surface 61S of the transfer-receiving body 61, and the entire transfer body 41 is covered with the upper laminate material 62. The transfer-receiving body 61 has the characteristic of being discolored upon irradiation with a laser beam, and internally contains an irradiated area 61a, which is an area discolored by irradiation with a laser beam. A surface of the second lower laminate material 64 in contact with the transfer-receiving body 61 is a print-receiving surface 64S, and the print-receiving surface 64S has a print 65 formed by a printing method.

Of the information contained in the authentication certificate 60, for example, the name 60A of the authentication certificate 60, and the type 60C1 of personal information in the character string 60C are information contained in the print 65. On the other hand, of the information contained in the authentication certificate 60, for example, the image 60B and the unique information 60C2 in the character string 60C are information contained in the irradiated area 61a.

[Material for Forming Each Layer]

Among the layers of the authentication certificate 60, the materials for forming layers other than the adhesion layer 21, the release layer 22, the intermediate layer, and the substrate, which are common in the first embodiment, will be described. The following laminate materials can also be used in the first embodiment.

[Relief Layer]

The relief layer 51 is a layer that has a relief surface 51S containing a relief structure having an optical effect.

An ultraviolet-curing resin can be used as the material for forming the relief layer. Instance of ultraviolet-curing resins include monomers, oligomers, polymers, and the like that have an ethylenically unsaturated bond or an ethylenically unsaturated group.

Instance of monomers include 1,6-hexanediol, neopentyl glycol diacrylate, trimethylolpropane triacrylate, pentaerythritol triacrylate, pentaerythritol tetraacrylate, dipentaerythritol pentaacrylate, dipentaerythritol hexaacrylate, and the like. Examples of oligomers include epoxy acrylate, urethane acrylate, polyester acrylate, and the like. Examples of polymers include urethane-modified acrylic resins, epoxy-modified acrylic resins, and the like.

A thermoplastic resin or a thermosetting resin can be used as the material for forming the relief layer. Examples of thermoplastic resins include acrylic-based resins, epoxy-based resins, cellulose-based resins, vinyl-based resins, and the like. Examples of thermosetting resins include urethane resins, melamine-based resins, epoxy resins, phenol-based resins, and the like.

The material for forming the relief layer 51 preferably contains an ultraviolet-curing resin among the above resins. The material for forming the relief layer 51 preferably contains at least one ultraviolet-curing resin selected from the group consisting of a monomer, a polyfunctional monomer, and a polyfunctional oligomer. Moreover, the material for forming the relief layer 51 preferably contains an organosilicon compound. It is preferable that the organosilicon compound has, per molecule, a functional group reactive with organic substances and binding to organic substances, and a functional group reactive with inorganic substances and binding to inorganic substances. In the material for forming the relief layer 51, the ratio of the mass of the ultraviolet-curing resin to the mass of the organosilicon compound is preferably within the range of 3:7 to 9:1.

In general, when resins corresponding to the use of ultraviolet-curing resins are selected, high heat resistance can be relatively easily imparted to layers formed using ultraviolet-curing resins. In contrast, such ultraviolet-curing resins can impart high heat resistance, and also often impart high rigidity and high toughness to layers formed using ultraviolet-curing resins. Therefore, when a layer formed using an ultraviolet-curing resin is transferred as part of a transfer body, together with an adhesion layer, to a transfer-receiving body, burrs and cracks mentioned above tend to be formed, and the accuracy of the outline shape of the layer containing the ultraviolet-curing resin, among the layers formed by transfer, tends to be reduced.

When an ultraviolet-curing resin is cured, the volume of the ultraviolet-curing resin is generally not a little contracted. Such contraction also occurs when an uncured portion of the relief layer 51 after irradiation with ultraviolet light is cured by heat and pressure applied in the step of integrating the transfer-receiving body 61, the upper laminate material 62, the first lower laminate material 63, and the second lower laminate material 64. Volume contraction in the relief layer 51 easily causes breakage of the relief layer 51.

Among organosilicon compounds, those having a functional group bonding to an organic substance, and a functional group bonding to an inorganic substance per molecule are named silane-coupling agents.

A silane-coupling agent contains silicon, a functional group reactive with organic substances, and a functional group reactive with inorganic substances, per molecule. Examples of functional groups reactive with organic substances include an amino group, an epoxy group, a methacrylic group, a vinyl group, a mercapto group, and the like. The functional group reactive with inorganic substances is a hydrolyzable atomic group, which contains, for example, oxygen and hydrocarbon. In one molecule of the silane coupling agent, such two functional groups are each bonded to silicon.

Organosilicon compounds are bonded together by silanol dehydration condensation reaction after hydrolysis to form a siloxane bond. The bond energy of the siloxane bond is higher and more stable than that of a carbon-carbon bond, which is a main skeleton of polymers that constitute plastic. Moreover, the bond distance of the siloxane bond is longer than that of the carbon-carbon bond, the electron density is lower, and the rotational energy of the siloxane bond is almost zero; thus, rotation in the siloxane bond is easy, and the flexibility of the siloxane bond is very high.

Therefore, when a siloxane bond is incorporated into an ultraviolet-curing resin, specifically, when an ultraviolet-curing resin and an organosilicon compound are mixed, it is possible to reduce the rigidity and toughness of the ultraviolet-curing resin, and to reduce contraction of the ultraviolet-curing resin by curing, while maintaining the high heat resistance of the ultraviolet-curing resin.

As described above, the ratio of the mass of the ultraviolet-curing resin to the mass of the organosilicon compound in the relief layer 51 is preferably within the range of 3:7 to 9:1. Supposing that the sum of the mass of the ultraviolet-curing resin and the mass of the organosilicon compound is 100%, when the mass of the organosilicon compound is 10% or more, cracks caused by contraction of the relief layer 51 can be prevented. When the mass of the organosilicon compound is 70% or less, rigidity and toughness are prevented from decreasing due to the reduction in the ratio of the ultraviolet-curing resin in the relief layer 51, and the formation of cracks in the relief layer 51 caused thereby can be prevented.

The ultraviolet-cured resins having high heat resistance mentioned above in a cured state often tend to have low adhesion to the material for forming the reflective layer 52. In contrast, ultraviolet-curing resins that tend to have higher adhesion to the material for forming the reflective layer 52 have low heat resistance; thus, it is difficult for them to have sufficient resistance to heat and pressure applied in the step of integrating the transfer-receiving body 61, the upper laminate material 62, the first lower laminate material 63, and the second lower laminate material 64.

The above organosilicon compound can increase the adhesion between the ultraviolet-curing resin and the material for forming the reflective layer 52 due to the functional groups contained in the organosilicon compound. When the material for forming the reflective layer 52 is aluminum or zinc sulfide, the adhesion between the relief layer 51 and the reflective layer 52 can be increased in which the organosilicon compound contains an amino group. Moreover, when the material for forming the reflective layer 52 is aluminum or titanium dioxide, the adhesion between the relief layer 51 and the reflective layer 52 can be increased in which the organosilicon compound contains an acrylic group or a methacrylic group.

In this case, the ratio (M3:M4) of the mass of the ultraviolet-curing resin (M3) to the mass of the organosilicon compound (M4) in the relief layer 51 is preferably within the range of 3:7 to 7:3. That is, M3/M4 is preferably within the range of 3/7 to 7/3. Supposing that the sum of the mass of the ultraviolet-curing resin and the mass of the organosilicon compound is regarded as 100%, when the mass of the organosilicon compound is 30% or more, the adhesion between the reflective layer 52 and the relief layer 51 can be increased. Thereby, prevention of breakage of the relief layer 51, and increase in the adhesion between the relief layer 51 and the reflective layer 52 can be both achieved.

The melting point of the relief layer 51 is preferably 180° C. or more, and more preferably 200° C. or more. The relief layer 51 may not have a melting point When the melting point is 180° C. or more, the relief layer 51 can have sufficient resistance to heat and pressure applied in the step of integrating the transfer-receiving body 61, the upper laminate material 62, the first lower laminate material 63, and the second lower laminate material 64. Moreover, when the melting point is 200° C. or more, damage and deformation of the relief surface 51S can be more reliably prevented in the step of integrating the transfer-receiving body 61, the upper laminate material 62, the first lower laminate material 63, and the second lower laminate material 64.

The relief surface 51S contains fine irregularities. The irregularities may be configured to have a shape that has any of the characteristic to diffract light, the characteristic to suppress reflection of light, the characteristic to emit isotropic or anisotropic diffused light, the characteristic as a lens to converge or emit light, the characteristic to selectively reflect only predetermined polarized light, and the like. The relief surface 51S may contain two or more irregularities with shapes having different characteristics among these characteristics. The thickness of the relief layer 51 can be set to 1 μm or more and 25 μm or less.

When the irregularities of the relief surface 51S are provided with, for example, a region of a diffraction grating structure with a pitch of 0.5 μm or more and 2 μm or less, and a depth of 0.05 μm or more and 0.5 μm or less, the irregularities have the characteristic to diffract light. When the irregularities are provided with, for example, a moth-eye structure or deep grating structure with a pitch of 0.1 μm or more and 0.5 μm or less, and a depth of 0.25 μm or more and 0.75 μm or less, the irregularities have the characteristic to suppresses reflection of light. When the irregularities are provided with, for example, a region of an acyclic line- or dot-shaped repeating structure with an average pitch of 0.5 μm or more and 3 μm or less, and a depth of 0.05 μm or more and 0.5 μm or less, the irregularities have the characteristic to emit isotropic or anisotropic diffused light.

When the irregularities are provided with a concentric lens structure or a plurality of linear prism structures, in which the height or depth (b) is 0.1 μm or more and 10 μm or less, and the ratio of height or depth (b) to pitch (a), i.e., aspect ratio (b/a), is 0.3 or more and 3.0 or less, the irregularities have the characteristic as a lens to converge or emit light. When the irregularities are provided with a deep grating structure with a pitch of 0.1 μm or more and 0.4 μm or less, and a depth of 0.25 μm or more and 0.75 μm or less, the irregularities have the characteristic to selectively reflect only predetermined polarized light.

The relief layer 51 may have one of the above structures, may have one structure as a plurality of regions, or may have a plurality of structures as a plurality of regions.

Because the second resin has a low melting point, and its flowability is easily increased by heating, an adhesion layer is easily bonded along the irregularities of the relief surface 51S. Moreover, the relief surface 51S may have a region without irregularities. In the region without irregularities, stress is less likely to be concentrated when external force to peel the adhesion layer is generated, and the region is less likely to be peeled. Therefore, the region without irregularities of the relief surface 51S can be expected to have an anchor effect that prevents peeling of the transfer region.

The optical effect of the relief surface 51S may be able to be recognized by visual observation, or may be able to be detected by a device. According to the relief surface 51S, counterfeit or forgery of the authentication certificate 60 containing the relief layer 51 can be prevented, and aesthetics can be increased.

[Reflective Layer]

The reflective layer 52 is a layer for increasing the optical effect of the relief structure formed in the relief surface 51S to such an extent that it can be easily visually recognized. The material for forming the reflective layer 52 is preferably aluminum, zinc sulfide, or titanium dioxide, as described above. Among these, aluminum is preferable because it is inexpensive, an opaque film with high gloss can be obtained, and it is easy to handle. Zinc sulfide and titanium dioxide are preferable because they have high refractive index to visible light, so that reflectance in visible light can be easily increased, and they are easily processed. The reflective layer is a monolayer or a multilayer. The reflective layer is generally formed by vapor deposition, CVD, or spattering one time or multiple times. The thickness of the reflective layer 52 can be set to 10 nm or more and 500 nm or less.

As described above, the reflective layer 52 may be positioned on the entire relief surface 51S, but may be positioned in part of the relief surface 51S. In a configuration in which the reflective layer 52 is positioned only in part of the relief surface 51S, the reflective layer 52 preferably has a shape showing a specific character or picture pattern in plan view facing the relief surface 51S. Due to this configuration, the transfer foil 40 has higher designability, compared with a configuration in which the reflective layer 52 is positioned on the entire relief surface 51S. Further, forgery of the authentication certificate 60 containing the reflective layer 52 can be prevented because the processing for forming the reflective layer 52 is complicated.

[Transfer-Receiving Body]

Usable examples of the material for forming the transfer-receiving body 61 include materials obtained by adding, to various resins, energy-absorbing bodies that absorb laser beams, and thermosensitive discoloration materials, specifically materials having the characteristic of changing from a first color to a second color by heat. PET, PEN, PP, PVC, PET-G, PC, etc., can be used as the various resins. For example, LEXAN SD8B94 produced by SABIC can be used for the transfer-receiving body 61.

The thickness of the transfer-receiving body 61 is preferably 50 μm or more and 500 μm or less, and more preferably 75 μm or more and 400 μm or less.

[Laminate Material]

Plastic films can be used for the upper laminate material 62, the first lower laminate material 63, and the second lower laminate material 64. PET, PEN, PP, PVC, PET-G, PC, etc., can be used as the material for forming each laminate material. Among these, plastic films formed from any of PVC, PET-G, and PC are generally used as laminate materials of various cards, and laminate materials of passports. These plastic films are preferable because integration processing with heat and pressure is easy.

The thickness of each laminate material is preferably 50 μm or more and 500 μm or less, and more preferably 75 μm or more and 400 μm or less. When the thickness of each laminate material is 50 μm or more, insufficiency of the physical strength of each laminate material is prevented. As a result, difficulty in handling each laminate material is prevented. Further, when the print 65 is formed, wrinkles are less likely to be formed in the laminate materials. Moreover, when the thickness of each laminate material is 500 μm or less, variation in the thickness of each laminate material, and deflection thereof can be prevented from affecting the accuracy of processing in each step for producing the authentication certificate 60. The melting point of each laminate material is preferably 120° C. or more and 250° C. or less. The laminate materials mentioned above are also used for the security laminate 30 of the first embodiment.

[Print]

The print 65 has the function to impart the various types of information mentioned above to the authentication certificate 60. The print 65 may have a color. Further, the print 65 may have a shape corresponding to information to be given to the authentication certificate 60.

The print 65 is formed, for instance, with ink. As the ink for forming the print 65, offset ink, typographic ink, gravure ink, or the like can be applied depending on the printing method. Moreover, as the ink, resin ink, oil-based ink, water-based ink, or the like can be applied depending on the composition of the ink. Furthermore, as the ink, oxidation polymerization type ink, penetration drying type ink, evaporation drying type ink, ultraviolet curing ink, or the like can be used depending on the drying method. The print 65 can be formed into a shape corresponding to the information using halftone dots or multiple lines. The print 65 can be formed by gravure printing, offset printing, gravure offset printing, screen printing, flexographic printing, or the like.

The ink may also be functional ink. According to a print 65 using functional ink, the color of the print 65 changes depending on the angle at which the print 65 is irradiated with light, or the angle at which the print 65 is visually recognized. Usable examples of functional ink include optical variable ink, color shift ink, pearl ink, and the like.

The print 65 may be formed by an electrophotographic method using a toner. In this case, for instance, a toner is prepared by attaching colored particles, such as graphite or pigment, to charged plastic particles. The toner is transferred to a print-receiving body by the static electricity of the plastic particles. The transferred toner is fixed by heating to the print-receiving body. Thus, a print 65 can be formed.

[Method for Producing Authentication Certificate]

The method for producing an authentication certificate will be described with reference to FIGS. 15 to 19. The print 65 of the authentication certificate 60, and the irradiated area 61a of the transfer-receiving body 61 are omitted below for convenience of drawing.

The method for producing the authentication certificate 60 comprises forming a transfer body 41 containing an adhesion layer 21 on a support surface 11S of a film-like substrate 11 to form a transfer foil 40, and transferring the transfer body 41 of the transfer foil 40 to a transfer-receiving body 61, which is an example of the first laminate material. The method for producing the authentication certificate 60 further comprises bonding the transfer-receiving body 61 and an upper laminate material 62, which is an example of the second laminate material, while stacking the upper laminate material 62 on the transfer-receiving body 61 to thereby sandwich the transfer body 41 between the transfer-receiving body 61 and the upper laminate material 62.

Formation of the transfer foil 40 includes formation of the adhesive layer 21. In the formation of the adhesive layer 21, the adhesive layer 21 is formed so that the adhesive layer 21 contains an adhesion surface 21S on the opposite side of a surface in contact with the support surface 11S, and so that the adhesive layer 21 contains a plurality of resin particles 21a respectively comprising a first resin, and a layered base material 21b having a layered shape, comprising a second resin with a melting point lower than that of the first resin, and filling gaps between the resin particles 21a.

Figure 15:
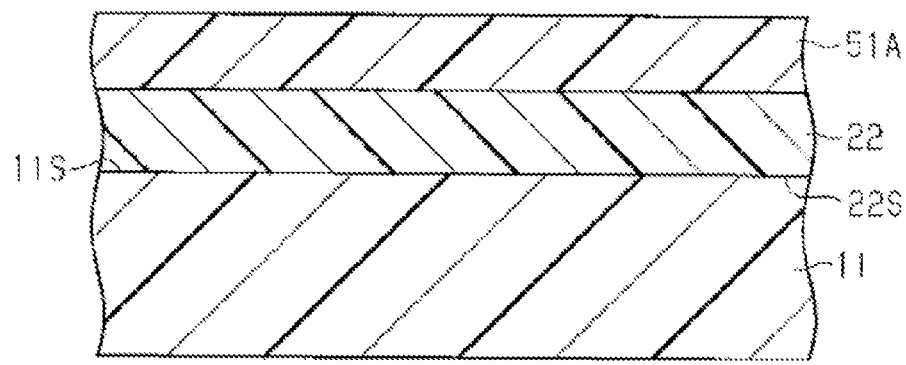
FIG. 15 is a process diagram illustrating a process of forming a precursor layer in the second embodiment that embodies a method for producing a security laminate.

More specifically, as shown in FIG. 15, after a release layer 22 is formed on the support surface 11S of the substrate 11 by the same method as the first embodiment, a precursor layer 51A of a relief layer 51 is formed on a surface of the release layer 22 on the opposite side of the release surface 22S. Printing and coating are used to form the precursor layer 51A. An applicable instance of printing includes gravure printing. Applicable instances of coating include gravure coating, micro-gravure coating, and the like. The thickness of the precursor layer 51A can be set to 1 μm or more and 25 μm or less.

Figure 16:
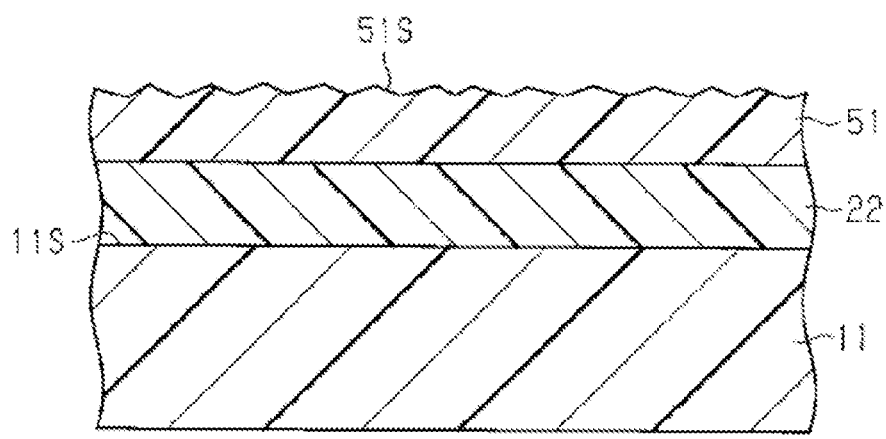
FIG. 16 is a process diagram illustrating a process of forming a relief layer.

As shown in FIG. 16, a stamper for forming a relief surface 51S is pressed to a surface of the precursor layer 51A before curing on the opposite side of a surface in contact with the release layer 22. Then, the precursor layer 51A is irradiated with ultraviolet light, while the stamper is pressed to the precursor layer 51A, or after the stamper is separated from the precursor layer 51A. The relief layer 51 with the relief surface 51S can be thereby obtained.

Figure 17:
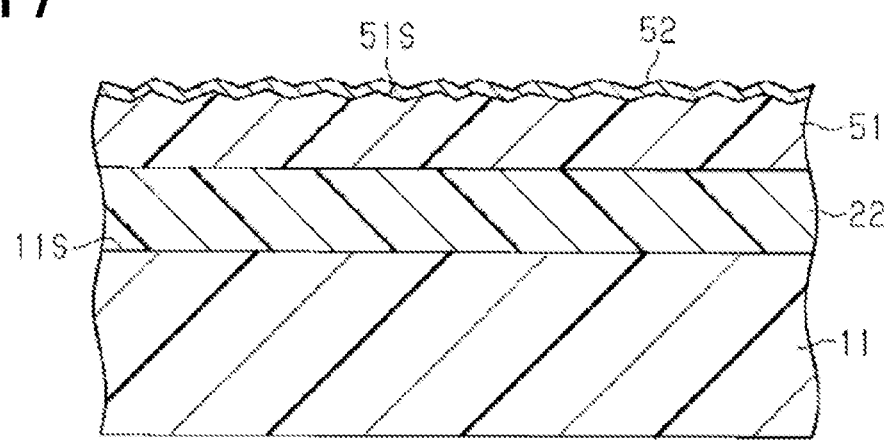
FIG. 17 is a process diagram illustrating a process of forming a reflective layer.

As shown in FIG. 17, a reflective layer 52 is formed on the entire relief surface 51S. A vacuum deposition method, a sputtering method, etc., can be used as the method for forming the reflective layer 52. The reflective layer 52 positioned in part of the relief surface 51S can be formed by the following method. After a soluble resin is applied to a portion of the relief surface 51S in which the reflective layer 52 is not positioned, a reflective layer is formed on the entire relief surface 51S. Subsequently, the soluble resin and the reflective layer formed on the soluble resin are removed by cleaning, whereby a reflective layer can be formed in part of the relief surface 51S.

Alternatively, when the material for forming the reflective layer is aluminum, a thin film of aluminum is formed on the entire relief surface 51S, and then an acid-resistant resin or alkali-resistant resin is disposed in a portion of the aluminum thin film in which the relief surface 51S is to be positioned. Subsequently, the aluminum thin film is etched with an acid or alkali, whereby a reflective layer can be positioned in part of the relief surface 51S.

Alternatively, after a thin film of aluminum is formed on the entire relief surface 51S, a resin whose solubility changes upon light exposure is applied to the entire relief surface 51S. Then, the resin is exposed using a mask to a portion of the relief surface 51S in which a reflective layer is to be positioned. Subsequently, the reflective layer is etched, and the resin remaining on the reflective layer is washed, whereby the reflective layer can be positioned in part of the relief surface 51S.

Figure 18:
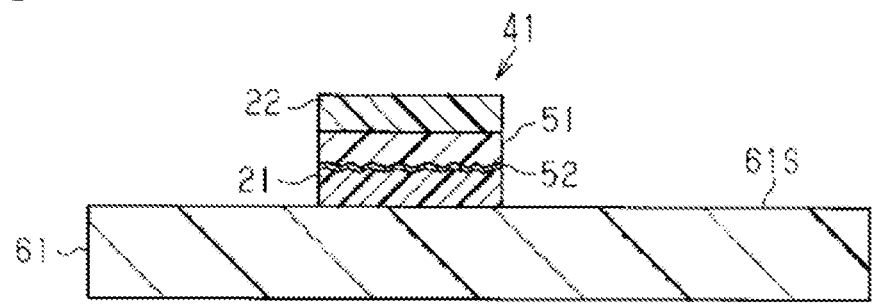
FIG. 18 is a process diagram illustrating a process of transferring a transfer body to a transfer-receiving body.

As shown in FIG. 18, after an adhesion layer 21 is formed on a surface of the reflective layer 52 on the opposite side of a surface in contact with the relief layer 51, the transfer body 41 of the transfer foil 40 is transferred to the transfer-receiving surface 61S of the transfer-receiving body 61 by the same method as the first embodiment.

Figure 19:
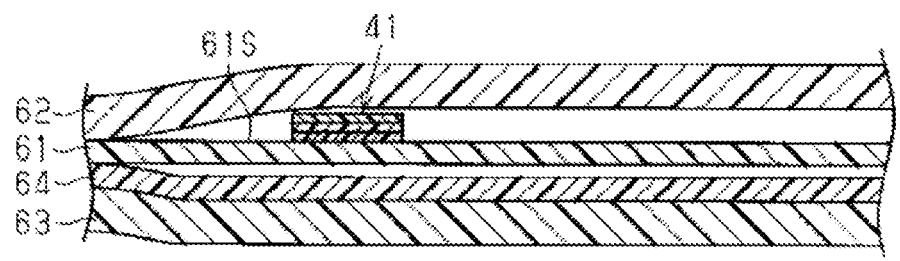
FIG. 19 is a process diagram illustrating a process of integrating a transfer-receiving body, an upper laminate material, a first lower laminate material, and a second lower laminate material.

As shown in FIG. 19, an upper laminate material 62, a first lower laminate material 63, and a second lower laminate material 64 are prepared. Then, while the transfer-receiving body 61 containing the transfer body 41 is sandwiched between the upper laminate material 62 and the second lower laminate material 64, and while the first lower laminate material 63 is in contact with the second lower laminate material 64, the transfer-receiving body 61, the upper laminate material 62, the first lower laminate material 63, and the second lower laminate material 64 are laminated. In this manner, the transfer-receiving body 61, the upper laminate material 62, the first lower laminate material 63, and the second lower laminate material 64 are fused to each other. That is, while the transfer body 41 is sandwiched between the transfer-receiving body 61 and the upper laminate material 62, the transfer-receiving body 61 and the upper laminate material 62 are fused. Thus, the authentication certificate 60 previously described with reference to FIG. 14 can be obtained. In the above manner, the authentication certificate 60 in the form of a card or a booklet page can be obtained.

Regarding the transfer-receiving body 61, the upper laminate material 62, the first lower laminate material 63, and the second lower laminate material 64, an adhesive may be positioned between the transfer-receiving body 61 and the upper laminate material 62, between the transfer-receiving body 61 and the second lower laminate material 64, and between the second lower laminate material 64 and the first lower laminate material 63. That is, the transfer-receiving body 61, the upper laminate material 62, the first lower laminate material 63, and the second lower laminate material 64 may be integrated together by adhesion using an adhesive.

Moreover, the transfer body 41 is transferred to the transfer-receiving body 61, and the transfer-receiving body 61, the upper laminate material 62, the first lower laminate material 63, and the second lower laminate material 64 are integrated together. Then, the transfer-receiving body 61 is irradiated with a laser beam. Thus, an irradiated area 61a can be formed. Furthermore, the print 65 can be formed on the print-receiving surface 64S of the second lower laminate material 64 before the transfer-receiving body 61, the upper laminate material 62, the first lower laminate material 63, and the second lower laminate material 64 are integrated together.

TEST EXAMPLES

Test Example 1

After a release layer was formed by the same method as Example 1, relief layer ink having the following composition was applied to a thickness of 1 μm to the release layer by gravure coating to thereby form a precursor layer. In the relief layer ink, i.e., in the relief layer, the ratio of the mass of an ultraviolet-curing resin to the mass of an organosilicon compound was set to 9:1.

After the solvent contained in the relief layer ink was removed by volatilization, a cylindrical metal plate for forming a relief surface was pressed to the precursor layer to thereby perform roll-forming processing. In the roll-forming processing, the pressing pressure was set to 2 kg/cm$^2$, the pressing temperature was set to 240° C., and the pressing speed was set to 10 m/min.

After roll-forming processing, the precursor layer was irradiated with ultraviolet light containing a wavelength of 365 nm to cure the ultraviolet-curing resin, thereby forming a relief layer. Then, an adhesion layer was formed on the relief surface of the relief layer by the same method as Example 3, thereby obtaining a transfer foil of Test Example 1.

[Relief Layer Ink]
Ultraviolet-curing resin having an ethylenically unsaturated group
Organosilicon compound (KBM-503, produced by Shin-Etsu Chemical Co., Ltd.)
Methyl ethyl ketone (VC102, produced by Toyo Ink Co., Ltd.)

The transfer body provided in the transfer foil was transferred to a transfer-receiving body (same as Example 1) under the same conditions as those of Example 1. Then, an upper laminate material (LEXAN SD8B14, produced by SABIC) with a thickness of 100 μm, a first lower laminate material (same as the upper laminate material) with a thickness of 100 μm, and a second lower laminate material (LEXAN SD8B24, produced by SABIC) with a thickness of 400 μm were prepared.

The first lower laminate material, the second lower laminate material, the transfer-receiving body, and the upper laminate material were stacked in this order, and were laminated in this state while applying heat and pressure to thereby integrate the first lower laminate material, the second lower laminate material, the transfer-receiving body, and the upper laminate material. When these layers were laminated, the temperature was set to 190° C., the pressure was set to 80 N/cm$^2$, and the time was set to 25 minutes. Thus, a security laminate of Test Example 1 was obtained.

Test Example 2

A security laminate of Test Example 2 was obtained by the same method as Test Example 1, except that the ratio of the mass of the ultraviolet-curing resin to the mass of the organosilicon compound in the relief layer was changed to 7:3.

Test Example 3

A security laminate of Test Example 3 was obtained by the same method as Test Example 1, except that the ratio of the mass of the ultraviolet-curing resin to the mass of the organosilicon compound in the relief layer was changed to 5:5.

Test Example 4

A security laminate of Test Example 4 was obtained by the same method as Test Example 1, except that the ratio of the mass of the ultraviolet-curing resin to the mass of the organosilicon compound in the relief layer was changed to 3:7.

Test Example 5

A security laminate of Test Example 5 was obtained by the same method as Test Example 1, except that an organosilicon compound was not used as the material for forming a relief layer.

Test Example 6

A security laminate of Test Example 6 was obtained by the same method as Test Example 1, except that an ultraviolet-curing resin was not used as the material for forming a relief layer.

Test Example 7

A security laminate of Test Example 7 was obtained by the same method as Test Example 1, except that the ratio of the mass of the ultraviolet-curing resin to the mass of the organosilicon compound in the relief layer was changed to 1:9.

Test Example 8

A security laminate of Test Example 8 was obtained by the same method as Test Example 1, except that a relief layer was formed using a thermoplastic resin. In Test Example 8, ink having the following composition was used as the relief layer ink.

[Relief Layer Ink]
Polymer methacrylate (PMMA) resin
(Dianal BR88, produced by Mitsubishi Rayon Co., Ltd.): 10 parts
Low-viscosity nitrocellulose (BTH1/2, produced by Asahi Chemical Industry Co., Ltd): 5 parts
Cyclohexanone (S705, produced by Toyo Ink Co., Ltd.): 10 parts
Methyl ethyl ketone (VC102, produced by Toyo Ink Co., Ltd.): 80 parts

TABLE 2

|  | Resin | Organo-silicon compound | Resin:organo-silicon compound | Crack |
|---|---|---|---|---|
| Test Example 1 | Ultraviolet-curing resin | + | 9:1 | None |
| Test Example 2 | Ultraviolet-curing resin | + | 7:3 | None |
| Test Example 3 | Ultraviolet-curing resin | + | 5:5 | None |
| Test Example 4 | Ultraviolet-curing resin | + | 3:7 | None |
| Test Example 5 | Ultraviolet-curing resin | − | — | Cracked |
| Test Example 6 | — | + | — | — |
| Test Example 7 | Ultraviolet-curing resin | + | 1:9 | Cracked |
| Test Example 8 | Thermoplastic resin | − | — | Melted |

[Evaluation]

As shown in Table 2, it was recognized that in the security laminates of Test Examples 1 to 4, cracks were not formed in the relief layer. In contrast, it was recognized that in the security laminates of Test Examples 5 and 7, cracks were formed in the relief layer.

Among these, regarding the relief layer of Test Example 5, it is considered that because an organosilicon compound was not used, the relief layer contracted, so that cracks were formed in the relief layer in the step of integrating the transfer-receiving body, the upper laminate material, the first lower laminate material, and the second lower laminate material. In contrast, regarding the relief layer of Test Example 7, it is considered that because the mass of the ultraviolet-curing resin was low, the rigidity and toughness of the relief layer were reduced, so that cracks were formed in the relief layer.

In Test Example 8, it was recognized that because the heat resistance of the relief layer was low, the relief layer was melted in the step of integrating the transfer-receiving body, the upper laminate material, the first lower laminate material, and the second lower laminate material. Moreover, in Test Example 6, it was recognized that because the relief layer was not cured, a transfer foil, and eventually a security laminate, could not be formed.

Test Example 9

After a release layer and a relief layer were formed by the same method as Test Example 3, except that an organosilicon compound containing an acrylic group (CH2=CH—CO—) (KBM-5103, produced by Shin-Etsu Chemical Co., Ltd.) was used, and a reflective layer with a thickness of 600 Å was formed by a vacuum deposition method on the relief surface of the relief layer. Then, an adhesion layer was formed on the reflective layer to thereby obtain a transfer foil of Test Example 9. Aluminum, titanium dioxide, or zinc sulfide was used as the material for forming the reflective layer, and three transfer foils were obtained using the different materials for forming the reflective layer.

Test Example 10

A transfer foil of Test Example 10 was obtained by the same method as Test Example 9, except that an organosilicon compound containing a methacrylic group (CH2=C(CH3)—CO—) (KBM-503, produced by Shin-Etsu Chemical Co., Ltd.) was used.

Test Example 11

A transfer foil of Test Example 11 was obtained by the same method as Test Example 9, except that an organosilicon compound containing an amino group (—NH2) (KBM-903, produced by Shin-Etsu Chemical Co., Ltd.) was used.

Test Example 12

A transfer foil of Test Example 12 was obtained by the same method as Test Example 9, except that an organosilicon compound to which a functional group was not added (same as Test Example 1) was used.

Test Example 13

A transfer foil of Test Example 13 was obtained by the same method as Test Example 9, except that an organosilicon compound containing an epoxy group represented by the following structural formula (1) (KBM-403, produced by Shin-Etsu Chemical Co., Ltd.) was used.

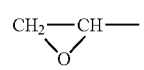

[Chem 1]

Test Example 14

A transfer foil of Test Example 14 was obtained by the same method as Test Example 9, except that an organosilicon compound containing a mercapto group (—SH) (KBM-803, produced by Shin-Etsu Chemical Co., Ltd.) was used.

Test Example 15

A transfer foil of Test Example 15 was obtained by the same method as Test Example 9, except that an organosilicon compound containing an isocyanate group (—N=C=O) (KBE-9007, produced by Shin-Etsu Chemical Co., Ltd.) was used.

Test Example 16

A transfer foil of Test Example 16 was obtained by the same method as Test Example 9, except that an organosilicon compound containing a vinyl group (CH2=CH—) (KBM-1003, produced by Shin-Etsu Chemical Co., Ltd.) was used.

Test Example 17

A transfer foil of Test Example 17 was obtained by the same method as Test Example 9, except that an organosilicon compound containing a silyl group ((CH3)3—Si—) (Dynasylan HMDS, produced by Evonik Industries) (Dynasylan is a registered trademark) was used.

TABLE 3

|  | Functional group | Aluminum | Titanium dioxide | Zinc sulfide |
|---|---|---|---|---|
| Test Example 9 | Acrylic group | Not peeled | Not peeled | Peeled |
| Test Example 10 | Methacrylic group | Not peeled | Not peeled | Peeled |

TABLE 3-continued

|  | Functional group | Aluminum | Titanium dioxide | Zinc sulfide |
|---|---|---|---|---|
| Test Example 11 | Amino group | Not peeled | Partially peeled | Not peeled |
| Test Example 12 | — | Peeled | Partially peeled | Peeled |
| Test Example 13 | Epoxy group | Peeled | Peeled | Peeled |
| Test Example 14 | Mercapto group | Peeled | Peeled | Peeled |
| Test Example 15 | Isocyanate group | Peeled | Peeled | Peeled |
| Test Example 16 | Vinyl group | Peeled | Peeled | Peeled |
| Test Example 17 | Silyl group | Peeled | Peeled | Peeled |

[Evaluation]

Transfer-receiving bodies (same as Example 1) were prepared, and the transfer bodies provided in the transfer foils of Test Examples 9 to 17 were each transferred to the transfer-receiving bodies under the same conditions as those of Example 1. As shown in Table 3, in the transfer foil of Test Example 12, when the material for forming the reflective layer was aluminum or zinc sulfide, most of the reflective layer was peeled from the relief layer ("Peeled"); whereas when the material for forming the reflective layer was titanium dioxide, the reflective layer was partially peeled from the relief layer ("Partially peeled").

In contrast, in the transfer foils of Test Examples 9 and 10, when the material for forming the reflective layer was aluminum or titanium dioxide, the reflective layer was not peeled from the relief layer ("Not peeled"); whereas when the material for forming the reflective layer was zinc sulfide, most of the reflective layer was peeled from the relief layer ("Peeled"). Moreover, in the transfer foil of Test Example 11, when the material for forming the reflective layer was aluminum or zinc sulfide, the reflective layer was not peeled from the relief layer ("Not peeled"); whereas when the material for forming the reflective layer was titanium dioxide, the reflective layer was partially peeled from the relief layer ("Partially peeled").

Furthermore, in the transfer foils of Test Examples 13 to 17, when the material for forming the reflective layer was any of aluminum, titanium dioxide, and zinc sulfide, most of the reflective layer was peeled from the relief layer ("Peeled").

In other words, in the transfer foils of Test Examples 13 to 17, the reflective layer is a transfer target to be transferred to a transfer-receiving body together with an adhesion layer. In the transfer foils of Test Examples 13 to 17, the accuracy of the outline shape can be increased in the layer formed by transfer on the transfer-receiving body, and containing an adhesion layer and a reflective layer. When not only the reflective layer, but also the relief layer, are contained in the transfer target to be transferred to a transfer-receiving body, together with an adhesion layer, the adhesion between the relief layer and the adhesion layer can be increased by the functional groups contained in the organosilicon compound, as is clear from the results obtained in Test Examples 9 to 12. In this manner, the accuracy of the outline shape can be increased in the layer formed by transfer on the transfer-receiving body and containing an adhesion layer, a reflective layer, and a relief layer.

Test Example 18

A transfer foil of Test Example 18 was obtained by the same method as Test Example 9, except that the ratio of the mass of the ultraviolet-curing resin to the mass of the organosilicon compound in the relief layer was changed to 7:3, and aluminum was used as the material for forming a reflective layer.

Test Example 19

A transfer foil of Test Example 19 was obtained by the same method as Test Example 18, except that the ratio of the mass of the ultraviolet-curing resin to the mass of the organosilicon compound in the relief layer was changed to 5:5.

Test Example 20

A transfer foil of Test Example 20 was obtained by the same method as Test Example 18, except that the ratio of the mass of the ultraviolet-curing resin to the mass of the organosilicon compound in the relief layer was changed to 3:7.

Test Example 21

A transfer foil of Test Example 21 was obtained by the same method as Test Example 18, except that the ratio of the mass of the ultraviolet-curing resin to the mass of the organosilicon compound in the relief layer was changed to 1:9.

Test Example 22

A transfer foil of Test Example 22 was obtained by the same method as Test Example 18, except that an organosilicon compound was not used as the material for forming a relief layer.

Test Example 23

A transfer foil of Test Example 23 was obtained by the same method as Test Example 18, except that an ultraviolet-curing resin was not used as the material for forming a relief layer.

Test Example 24

A transfer foil of Test Example 24 was obtained by the same method as Test Example 18, except that the ratio of the mass of the ultraviolet-curing resin to the mass of the organosilicon compound in the relief layer was changed to 9:1.

Test Example 25

A transfer foil of Test Example 25 was obtained by the same method as Test Example 18, except that a thermoplastic resin was used as the material for forming a relief layer.

TABLE 4

|  | Resin | Organosilicon compound | Resin:organosilicon compound | Peeling |
|---|---|---|---|---|
| Test Example 18 | Ultraviolet-curing resin | + | 7:3 | None |
| Test Example 19 | Ultraviolet-curing resin | + | 5:5 | None |
| Test Example 20 | Ultraviolet-curing resin | + | 3:7 | None |

TABLE 4-continued

| | Resin | Organo-silicon compound | Resin:organo-silicon compound | Peeling |
|---|---|---|---|---|
| Test Example 21 | Ultraviolet-curing resin | + | 1:9 | None |
| Test Example 22 | Ultraviolet-curing resin | − | — | Peeled |
| Test Example 23 | — | + | — | — |
| Test Example 24 | Ultraviolet-curing resin | + | 9:1 | Peeled |
| Test Example 25 | Thermoplastic resin | − | — | None |

[Evaluation]

Transfer-receiving bodies (same as Example 1) were prepared, and the transfer bodies of Test Examples 18 to 25 were each transferred to the transfer-receiving bodies under the same conditions as those of Example 1. As shown in Table 4, in the transfer foils of Test Examples 18 to 21 and 25, it was recognized that the reflective layer was not peeled from the relief layer. In contrast, the transfer foils of Test Examples 22 and 24, it was recognized that the reflective layer was peeled from the relief layer. In Test Example 23, it was recognized that a transfer foil could not be formed because the relief layer was not cured.

That is, it was recognized that the adhesion between the relief layer and the reflective layer was increased because the ratio of the mass of the ultraviolet-curing resin to the mass of the organosilicon compound in the relief layer was within the range of 1:9 to 7:3. However, as shown in Table 2, it was recognized that cracks were formed in the relief layer when the ratio of the mass of the ultraviolet-curing resin to the mass of the organosilicon compound was 1:9. Accordingly, because the ratio of the mass of the ultraviolet-curing resin to the mass of the organosilicon compound is within the range of 3:7 to 7:3, prevention of cracking in the relief layer, and increase in the adhesion between the relief layer and the reflective layer can be both achieved.

The same tendency as described above was observed in the ratio of the mass of the ultraviolet-curing resin to the mass of the organosilicon compound, not only when the functional group contained in the organosilicon compound was an acrylic group and the material for forming the reflective layer was aluminum, but also when the functional group contained in the organosilicon compound and the material for forming the reflective layer were the following combinations.

Specifically, the same tendency was observed when the organosilicon compound contained an acrylic group and the material for forming the reflective layer was titanium dioxide, and when the organosilicon compound contained a methacrylic group and the material for forming the reflective layer was aluminum or titanium dioxide. Further, the same tendency was also observed when the organosilicon compound contained an amino group and the material for forming the reflective layer was aluminum or zinc sulfide.

As explained above, according to the second embodiment of the transfer foil, the security laminate, and the method for producing a security laminate, the effects listed below can be obtained.

(4) When the mass of the ultraviolet-curing resin and the mass of the organosilicon compound in the relief layer 51 are within a suitable range, the organosilicon compounds form siloxane bonds in the relief layer 51, and the relief layer 51 contains siloxane bonds to a degree that suppress thermal contraction of the relief layer 51. Accordingly, the thermal contraction of the relief layer 51 can be prevented, and the formation of cracks in the relief layer 51 can be prevented.

(5) When the organosilicon compound contains an amino group, the material for forming the reflective layer 52 is aluminum or zinc sulfide, and the mass of the ultraviolet-curing resin and the mass of the organosilicon compound are within a suitable range, the adhesion between the relief layer 51 and the reflective layer 52 can be increased. Accordingly, when the transfer body 41 is transferred, the reflective layer 52 can be prevented from being peeled from the relief layer 51.

(6) When the organosilicon compound contains an acrylic group or a methacrylic group, the material for forming the reflective layer 52 is aluminum or titanium dioxide, and the mass of the ultraviolet-curing resin and the mass of the organosilicon compound are within a suitable range, the adhesion between the relief layer 51 and the reflective layer 52 can be increased. Accordingly, when the transfer body 41 is transferred, the reflective layer 52 can be prevented from being peeled from the relief layer 51.

(7) When the melting point of the relief layer 51 is 180° C. or more, even if the relief layer 51 contained in the transfer body 41 is heated and pressed in the production of the authentication certificate 60, the relief layer 51 can be prevented from being damaged or deformed.

REFERENCE SIGNS LIST 10, 40 . . . Transfer foil; 10T . . . Transfer target; 11 . . . Substrate; 11S . . . Support surface; 12, 41 . . . Transfer body; 21 . . . Adhesion layer; 21a . . . Resin particle; 21b . . . Layered base material; 21c . . . Film-like mass; 21S . . . Adhesion surface; 21T . . . Transfer region; 22 . . . Release layer; 22S . . . Release surface; 30 . . . Security laminate; 31, 61 . . . Transfer-receiving body; 31S, 61S . . . Transfer-receiving surface; 51 . . . Relief layer; 51A . . . Precursor layer; 51S . . . Relief surface; 52 . . . Reflective layer; 60 . . . Authentication certificate; 60A . . . Name; 60B . . . Image; 60C . . . Character string; 60C1 . . . Type; 60C2 . . . Unique information; 61a . . . Irradiated area; 62 . . . Upper laminate material; 63 . . . First lower laminate material; 64 . . . Second lower laminate material; 64S . . . Print-receiving surface; 65 . . . Print.

What is claimed is:

1. A transfer foil, comprising:
    a film-like substrate, and
    a layered transfer body having a pair of opposing surfaces and having an adhesion layer;
    wherein a first surface of the pair of opposing surfaces is in contact with the substrate so as to be peelable from the substrate, and the adhesion layer is provided so as to include a second surface of the pair of opposing surfaces,
    wherein the adhesion layer is a composite, and comprises a plurality of resin particles respectively comprising a first resin, and a layered base material comprising a second resin and filling gaps between the resin particles, and
    wherein the melting point of the second resin is lower than the melting point of the first resin, and,
    wherein the first resin is at least one of modified polyolefin, crystalline polyester, and an ethylene-vinyl acetate copolymer, and
    the second resin is at least one of an acrylic resin, non-crystalline polyester, and a vinyl acetate-vinyl chloride copolymer.

2. The transfer foil of claim 1, wherein:
the first resin is modified polyolefin or crystalline polyester, and
the second resin is an acrylic resin.

3. The transfer foil of claim 1, wherein:
the first resin is crystalline polyester, and
the second resin is an acrylic resin.

4. The transfer foil of claim 1, wherein:
the first resin is a crystalline resin, and
the second resin is a non-crystalline resin.

5. The transfer foil of claim 1, wherein:
the transfer body contains a relief surface with unevenness, and contains a relief layer constituted from an ultraviolet-curing resin and an organosilicon compound.

6. The transfer foil of claim 5, wherein:
the transfer body comprises a reflective layer,
the reflective layer covers at least part of the relief surface, and is constituted from aluminum or zinc sulfide, and
the organosilicon compound contains an amino group.

7. The transfer foil of claim 5, wherein:
the transfer body comprises a reflective layer,
the reflective layer covers at least part of the relief surface, and is constituted from aluminum or titanium dioxide, and
the organosilicon compound contains an acrylic group or a methacrylic group.

8. The transfer foil of claim 5, wherein:
the relief layer has a melting point of 180° C. or more.

9. A security laminate comprising:
a first laminate material,
a second laminate material, and
the transfer body of claim 1;
wherein the transfer body is positioned between the first laminate material and the second laminate material.

10. A method for producing a security laminate, the method comprising:
forming a transfer foil comprising a film-like substrate and a transfer body, the substrate having a support surface, the transfer body containing an adhesion layer, and the adhesion layer being formed on the support surface;
transferring the transfer body to a first laminate material; and
bonding the first laminate material and a second laminate material while the transfer body is sandwiched between the first laminate material and the second laminate material;
wherein the adhesion layer is a composite, and comprises a plurality of resin particles respectively comprising a first resin, and a layered base material comprising a second resin and filling gaps between the resin particles, and
the melting point of the second resin is lower than the melting point of the first resin, and,
wherein the first resin is at least one of modified polyolefin, crystalline polyester, and an ethylene-vinyl acetate copolymer, and
the second resin is at least one of an acrylic resin, non-crystalline polyester, and a vinyl acetate-vinyl chloride copolymer.

* * * * *